US008720205B2

(12) United States Patent
Lugg

(10) Patent No.: US 8,720,205 B2
(45) Date of Patent: May 13, 2014

(54) ADVANCED HYPERSONIC MAGNETIC JET/ELECTRIC TURBINE ENGINE (AHMJET)

(76) Inventor: Richard H. Lugg, Falmouth, ME (US)

(*) Notice: Subject to any disclaimer, the term of this patent is extended or adjusted under 35 U.S.C. 154(b) by 1832 days.

(21) Appl. No.: 11/518,276

(22) Filed: Sep. 11, 2006

(65) Prior Publication Data

US 2007/0126292 A1 Jun. 7, 2007

Related U.S. Application Data

(60) Provisional application No. 60/715,783, filed on Sep. 9, 2005.

(51) Int. Cl.
*F02K 7/08* (2006.01)
(52) U.S. Cl.
USPC .................................. 60/767; 60/805
(58) Field of Classification Search
USPC ............... 60/805, 262, 767, 768; 415/91
See application file for complete search history.

(56) References Cited

U.S. PATENT DOCUMENTS

| | | | | |
|---|---|---|---|---|
| 3,283,183 A * | 11/1966 | Yano et al. | | 310/11 |
| 3,678,306 A * | 7/1972 | Garnier et al. | | 310/11 |
| 4,586,871 A * | 5/1986 | Glass | | 415/90 |
| 5,376,827 A * | 12/1994 | Hines | | 290/52 |
| 6,397,577 B1 * | 6/2002 | Sondergaard | | 60/39.43 |
| 6,647,732 B2 * | 11/2003 | Kuo | | 60/804 |
| 6,696,144 B2 * | 2/2004 | Holowczak et al. | | 428/293.4 |
| 7,219,490 B2 * | 5/2007 | Dev | | 60/226.1 |
| 7,661,271 B1 * | 2/2010 | Millsaps | | 60/786 |
| 2004/0013510 A1 * | 1/2004 | Williams | | 415/1 |
| 2008/0175703 A1 * | 7/2008 | Lugg | | 415/66 |

* cited by examiner

*Primary Examiner* — Phutthiwat Wongwian
(74) *Attorney, Agent, or Firm* — Verrill Dana, LLP; Chris A. Caseiro

(57) ABSTRACT

With turbine segments controlled electrically in a shaftless design, the turbine of the present invention creates high propulsion efficiencies over a broader range of operating conditions through the integration of gas turbine, electric and magnetic power systems, advanced materials and alternative petroleum-based combustion cycles.

22 Claims, 13 Drawing Sheets

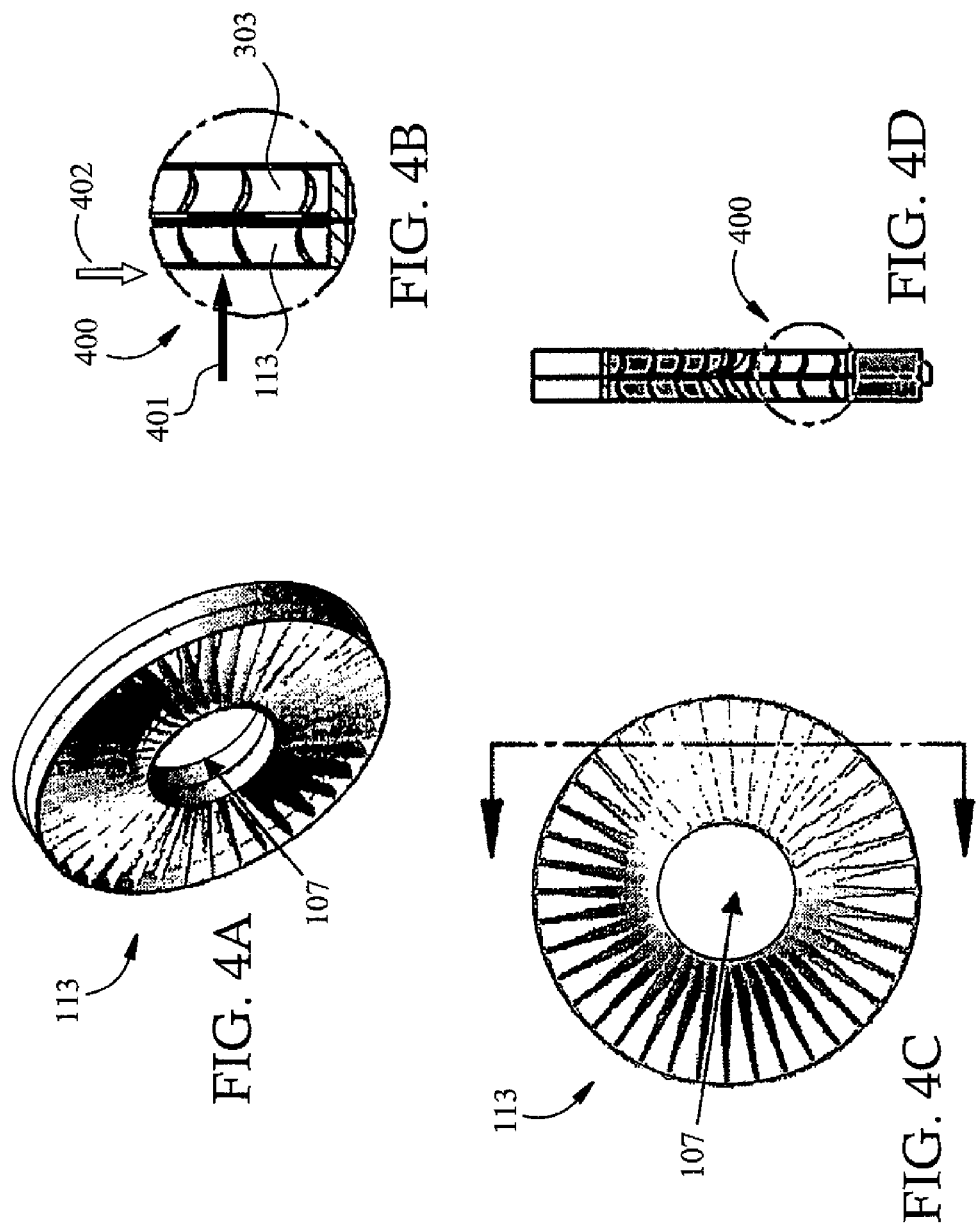

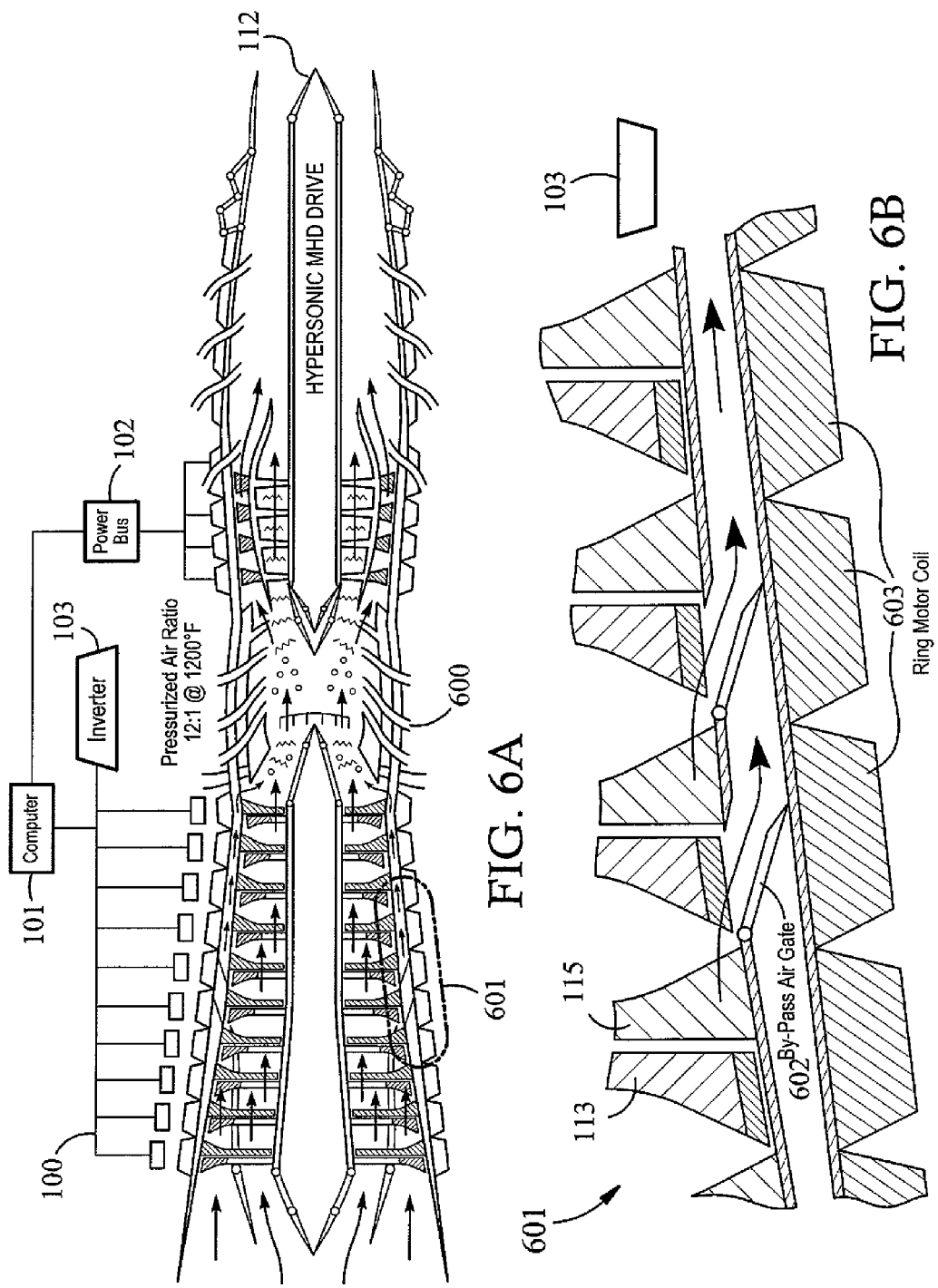

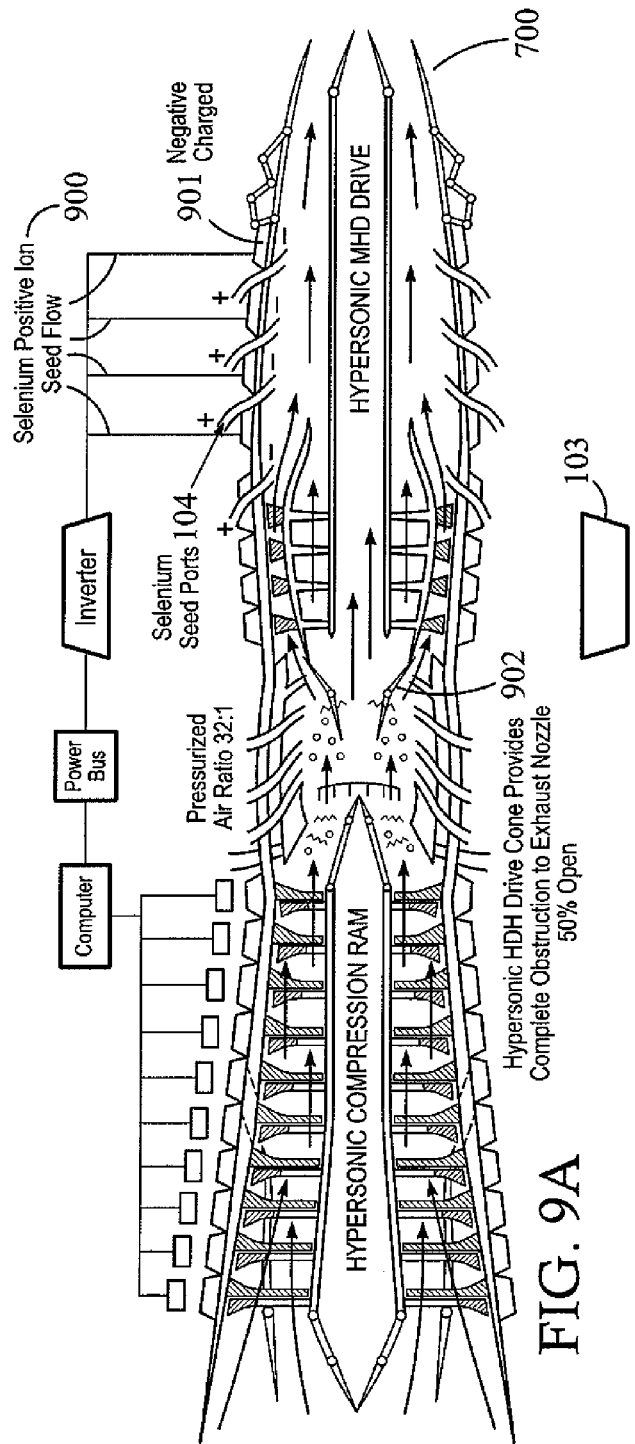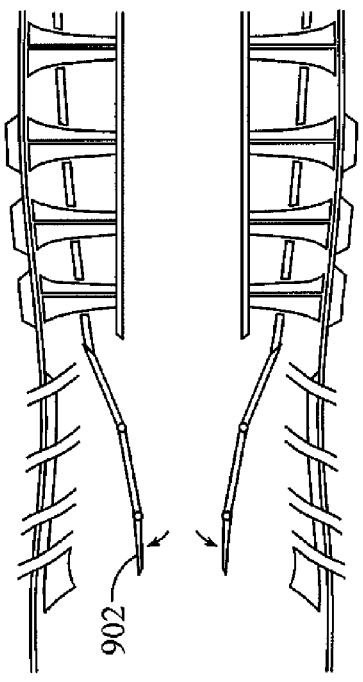
FIG. 9A
FIG. 9B

ADVANCED HYPERSONIC MAGNETIC JET/ELECTRIC TURBINE ENGINE (AHMJET)

CROSS REFERENCE TO RELATED APPLICATIONS

This application claims priority under 35 U.S.C. §119 from provisional application Ser. No. 60/715,783, filed Sep. 9, 2005, and entitled "Magneto Hydrodynamic Maglev Hybrid Electric Turbine".

FIELD OF THE INVENTION

The invention is related to the operation of a jet/electric turbine propulsion system at ideal compression, combustion and burn efficiencies, and at higher temperatures, throughout a broader range of operation, from low subsonic to high hypersonic flight speeds.

BACKGROUND

Gas turbine engines, and the devices that are powered by gas turbine engines, are limited in overall design and performance by mechanical, material, and thermodynamic laws. They are further constricted by the design limitations of the three elements that make up the baseline design of gas turbine engines: the compressor, the combustor and the turbine. In turbines for aircraft, these three engine sections are contained inside of the outer turbine casing and are centered on a load bearing drive shaft that connects the turbine (on the rearward portion of the drive shaft) with the compressor (on the forward portion of the drive shaft). Typically the drive shaft is a twin or triple spool design, consisting of two or three concentric rotating shafts nested one inside the other. The different spools allow the turbine assembly and the compressor assembly, each of which is connected to one of the spools of the drive shaft, to rotate at different speeds.

The turbine is optimized to run at one particular speed for combustion and thrust processes, and the compressor is optimized at a different speed to more efficiently compress incoming air at the inlet face and raise the air pressure to a significant point to where there is a pressure ratio differential, significant enough to provide combustion. Highly compressed air at ratios of 30:1 to 40:1 ignites when mixed with atomized fuel in the combustor. The difference in speeds of the spools is typically accomplished by reduction gears to accommodate the required speeds for combustion and propulsion operation.

The compressor assembly consists of numerous compressor stages, each of which is made up of a rotor and a diffuser, the number of stages dependent upon the total pressure ratio increase required to achieve combustion and produce the desired thrust. The rotor is a series of rotating airfoil blades, or fans (attached to the shaft), which converge the air, i.e., compressing the volume of air and increasing it's velocity, on the intake side of the blade, by passing it into a smaller volumes (convergent channels between airfoil rotor blades) in each the rotor chamber. Adjacent to each rotor is a diffuser (or stator). The diffuser is a fixed, non-rotating disc of airfoil stators whose sole purpose is to reduce the air velocity from the rotor and increase the pressure. The diffuser slows the air down by passing it through divergent (expanding) channels between the airfoil stators, thus recovering the pressure. Upon entering the diffuser the air passes from a narrow opening on the intake side of the diffuser into a gradually enlarging chamber (diffuser) that slows the velocity and raises the pressure of the air.

Each compressor stage is made up of a compressor rotor and a diffuser (stator) disc. There are as many stages of the compressor as are required to get the air to the required air temperature and compression ratio (in high performance aircraft turbines usually in between 12:1 to 30:1 dependent on combustor design, flight and speed envelope and turbine thrust requirements prior to entering the combustor.

In the combustor, the high pressure, high temperature, expanding air mixes in a swirl of hot vaporized fuel and ignites to form a controllable flame front. The flame front expands as it combusts, rotating and driving turbine blades as the flame front exits the engine. The turbine assembly consists of several sets of rotating turbine blades connected to the drive shaft and angled so that the thrust of the flame front causes the blades to rotate. The turbine blades, being connected to the drive shaft, cause the drive shaft to rotate and thus the compressor blades to rotate, consequently more air is compressed and the cycle starts all over again.

The Advanced Hypersonic Magnetic Jet-Electric Turbine (AHMJET) technology of the present invention integrates turbine, electric generation, magnetic power systems and propulsion, advanced materials technology, and alternative petroleum-based combustion cycles, to achieve a significant improvement in horsepower, combustion efficiency, electric power generation, flight envelope integration, and affordability over traditional gas turbine technology.

SUMMARY

One aspect of the invention pertains to a system for operating a jet turbine engine, said system comprising an exoskeleton turbine having dual phase lock attributes, wherein said exoskeleton turbine is shaftless; an electric controller for controlling said exoskeleton turbine; a main compressor; a diffuser; and a plurality of turbine components, wherein said compressor, said diffuser and said plurality of turbine components are in dynamic compression.

A second aspect of the invention relates to a system for creating magneto hydrodynamic drive, said system comprising a supersonic turbine jet flow; an alkaline substance stored within a jet turbine engine; and a gas stream having a substantial air speed; wherein said supersonic turbine jet flow is ionized with said alkaline substance and produces a power from said gas stream to create said magneto hydrodynamic drive.

A third aspect of the invention relates to a system for providing power for magnetic levitation, said system comprising a jet engine turbine having a rear; an outer casing of said jet engine turbine, said outer casing capable of bearing air; an airframe in which said outer casing is embedded; a turbine component having a trunion casing and also having a magnetic air bearing, wherein power is produced from said rear of said jet engine turbine for magnetic levitation of said outer casing; and a magnet induction coil ring motor adjacent to said magnetic air bearing, and wherein power is further provided to electrically drive the turbine component with said magnetic induction coil ring motor.

A fourth aspect of the invention discloses a system for operating a jet turbine engine, said system comprising an exoskeleton turbine having dual phase lock attributes, wherein said exoskeleton turbine is shaftless; an electric controller for controlling said exoskeleton turbine; a main compressor; a diffuser; an annular combustor; a turbine generator; and a gas-plasma dynamic generator, wherein said compressor, said diffuser, said combustor, said turbine generator, and said gas-plasma dynamic generator are in dynamic compression.

A fifth aspect of the invention pertains to a method of operating a magneto hydrodynamic drive generator in the turbine stage, said method comprising providing electric power from a magnetic ring motor; providing said electronic power to a plurality of ring motors in the compressor stage; providing said electric power to a magnetic air bearing system; and starting the magneto hydrodynamic drive generator.

A sixth aspect of the invention relates to a system for closing compressor blades during hypersonic flight, said system comprising an engine inlet; and a compressor stage having an aperture in the center of the compressor stage through which intake air is channeled; wherein said engine inlet closes said compressor blades and further wherein said aperture in the compressor stage causes drag from said compressor blades to be avoided.

A seventh aspect of the invention pertains to a system for closing power turbine blades, said system comprising a combustor; a high velocity air stream; a power turbine; a plurality of blades of said power turbine; and a petal cone aft of said combustor for closing said plurality of blades, wherein combustion is implemented in said high velocity air stream, and further wherein said combustion enters said combustor through a space in said jet engine turbine.

An eighth aspect of the invention discloses a system for generating electrical current, said system comprising a magneto hydrodynamic drive generator; an alkaline substance seed; a high-mach turbine efflux gas stream having a positive charge and ionized by said alkaline substance seed; a plurality of magnetic ring plates having a negative charge; and an exoskeleton turbine casing in which said plurality of magnetic ring plates are embedded, wherein said high-mach turbine efflux gas stream crosses perpendicular to said magnetic ring plates to generate electrical current.

A ninth aspect of the invention discloses a method of manufacturing turbine components with continuous ceramic fiber, said method comprising untwisting a plurality of fibers; alternatively breaking said plurality of fibers once to form at least one right angle; and weaving said plurality of fibers into a net shape perform.

A tenth aspect of the invention pertains to a method of manufacturing ceramic fiber reinforced composite component tools, said method comprising untwisting a plurality of fibers; alternatively breaking said plurality of fibers once to form at least one right angle; weaving said plurality of fibers into a net shape perform; laying said net shape perform into a tool containing coated mold release; closing said tool; injecting a glue into a plurality of ports of said tool; and curing said tool under pressure and temperature for a predetermined time.

It is an object of the invention to provide a shaftless, electrically controlled, in-and-out phase lock exoskeleton turbine, with the main compressor, diffuser and turbine components in dynamic compression.

Another object of the invention is to provide a magneto hydrodynamic drive ("MHD") that is created by ionizing the supersonic turbojet flow with a stored alkaline substance to produce megawatts of electrical power from the Mach 2.8-5.8+ gas stream.

It is another object of the invention to provide power from the rear of the turbine for magnetic levitation of the air bearing outer casing, embedded into the airframe at the segmented shaft-less compressor (rotor), diffuser (stator) and turbine stages, and for all other electric needs of aircraft, and directed energy payloads. It simultaneously provides power to drive the compressor electrically with the magnet induction coil ring motors that sit adjacent to the magnetic air bearing in each trunion casing of the compressor, diffuser and turbine.

Another object of the invention is to provide ceramic matrix components (stators, compressor vanes, turbine blades, diffuser, combustor casing, annular combustors, shroud segments, and turbine discs) for light weight and high temperature operation.

Still another object of the invention is to provide a shaftless, electrically controlled, in-and-out phase lock exoskeleton turbine, with a multi-stage compressor/diffuser (rotor/stator), a donut-ring diffuser annular combustor, a multi-stage turbine generator, and a gas-plasma dynamic generator (magneto hydrodynamic drive generator ("MHD"), with all rotating turbine components being maintained in dynamic compression by a magnetic levitation ("maglev") system.

Another object of the invention is to provide a multi-stage magnetic ring motor/generator in the turbine stage that provides electric power to the compressor stage ring motors and the magnetic air bearing system before the MHD generator comes on-line providing seamless electromagnetic power generation and propulsion between supersonic and hypersonic operation.

It is also an object of the invention to provide a petal cone engine inlet/diffuser that closes off the compressor blades during hypersonic flight, leaving the shaft hole in the center of the compressor stage as an aperture through which intake air is channeled (the aperture acts as a hypersonic compression ram), and drag from the compressor blades is avoided).

Another object of the invention is to provide a second petal cone aft of the combustor that closes off the blades of the power turbine (with both the inlet and turbine cones closed, the AHMJET operates as a pure hypersonic scramjet, implementing combustion in the high velocity air stream (Mach 2.8 and higher) that enters the combustor through the space in the turbine that would normally be occupied by a turbine shaft).

Another object of the invention is to provide an MHD generator that generates electrical current from a positively charged high-mach turbine efflux gas stream (ionized by an alkaline substance seed such as cesium, selenium, potassium) crossing perpendicular to negatively charged magnetic ring plates embedded in the exoskeleton turbine casing (the generator produces continuous levels of electrical power in the range of 10.0 to 12.0 MW, which can be used to power energy weapons, sensors or other payloads, and all vehicle electrical subsystems).

It is also an object of the invention to provide ceramic matrix components (stators, compressor vanes, turbine blades, diffuser, combustor casing, annular combustors, shroud segments, and turbine discs) for light weight and high temperature operation.

BRIEF DESCRIPTION OF THE DRAWINGS

FIG. 4A depicts a three-dimensional view of compressor/rotor of a stator in the AHMJET Turbine FIG. 4B depicts an enlargement of a portion of the cross section of the rotor and stator in the compression stage.

FIG. 4C depicts a frontal view of the intake and rotor.

FIG. 4D depicts cross section of a rotor/stator in the compression stage

DETAILED DESCRIPTION OF THE PREFERRED EMBODIMENT

Figure 1:
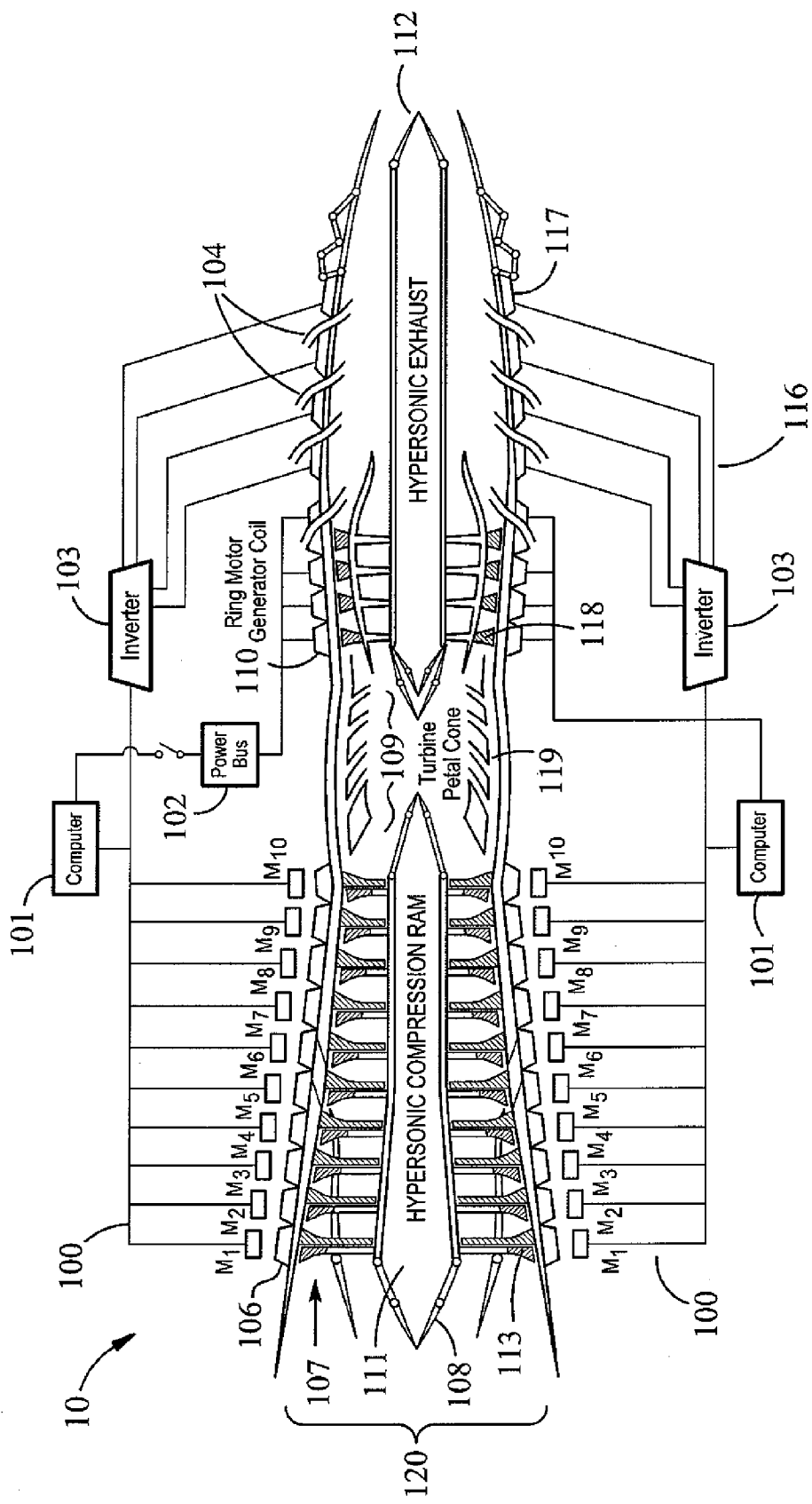
FIG. 1 provides a detailed depiction of the jet-electric turbine of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated apparatus, and such further applications of the principles of the invention as illustrated therein being contemplated as would normally occur to one skilled in the art to which the invention relates.

The alternative aerospace propulsion technology of the present invention integrated into this integrated aerospace propulsion produces sequentially across the flight envelop subsonic, transonic, supersonic and hypersonic velocity capabilities, from flight speeds as low as 100 KTAS flight capability for loiter, maximum thrust of 20,000-25,000 lb. and produce more than 10 MW of power from a 1000 lb. turbo machine. The technology consists of staged engine segments of compressor, combustor, turbine and plasma gas magneto hydrodynamic (MHD) drive generator, controlled electrically and magnetically in a shaftless exoskeleton architecture. This advanced hypersonic magnetic jet-electric turbine (AHMJET) achieves increases in thrust to weight ratio, specific thrust, mass flow-through capability, stage pressure ratio efficiency and increase, low thrust specific fuel consumption, and high electric power generation (12.0 MW) across a very broad flight envelope (low subsonic to high hypersonic) over a wide range of atmospheric conditions.

In addition, the AHMJET is a true hybrid as it operates as both a propulsion machine and an electric generation machine simultaneously. Its propulsion system operates as a low-bypass turbofan in subsonic mode, as a turbojet in supersonic mode and as a scramjet in hypersonic mode. The AHMJET is able to transition from one mode to another by altering its engine segment systems electrically and magnetically across the flight envelope. The AHMJET, by opening up the design continuum of future manned and unmanned air vehicles, has the potential of replacing existing gas turbine technologies.

The key components of the turbine propulsion system are disengaged or engaged electrically so that combustion cycles, cooling, thrust, and electric generation can be arranged and optimized for high thermodynamic and combustion efficiencies across the entire flight envelope, regardless of altitude, air density, temperature and other operating constraints.

FIG. 1 depicts a preferred embodiment of the turbine propulsion system 10 of the present invention. The system 10 contains controllers 100, M1 through M10) which are connected to a computer 101, a power bus 102 and an inverter 103. Each controller 100 is directly connected to a ring motor 106 on the jet-electric turbine. The power bus 102 is associated with a plurality of ring motor generator coils 110. The inverter 103 is coupled to magneto hydrodynamic drive seeding ports 104. Situated next to the seeding ports is the velocity gate exhaust mechanism 105.

The proximal portion of the system 10 contains an intake 120 having a low bypass air inlet 107 and a petal cone aft 108. The petal cone aft 108 is directly attached to the hypersonic compression ram 111, to which a series of rotors 113 are coupled. Below the rotors are the rotor trunions 114 and stators 115. These are, in turn, coupled to controllers 100, which are linked to computer 101 and inverter 103 in the manner previously described herein. The hypersonic compression ram abuts the combustor 109. Therein, a second petal cone 119 is situated. Also abutting the combustor 109 is hypersonic exhaust 112.

Ring motor turbine trunion magnets 118 are coupled as depicted. Adjacent are cables which stem from inverter 103 to magneto hydrodynamic seeking ports 104. Electromagnetic plates 117 are attached to the gate mechanism 105.

Compared to current turbine propulsion systems, the AHMJET system is designed to operate at ideal compression, combustion and burn efficiencies, and at higher temperatures, throughout a broader range of operation, from low subsonic (Mach 0.3) to high hypersonic (Mach 5.8+) flight speeds. This is due to the magnetic, thermodynamic, mechanical and electric technologies that enables that which is set forth below.

Pressure Ratio compressibility is matched to multiple design point operating conditions. Because the compressor of the invention has one or more rotor stages (compressor and diffuser), each being driven by one or more electric motors, the compressor rotor stages may be designed and tuned more precisely to the compression ratio to be attained within the turbine design operating characteristics, thrust requirements and flight envelope. Therefore this allows for optimal aerodynamic design and efficiencies of the rotor stages in the compressor and subsequently the possibility of fewer stages needed (hence potential significant weight savings) to achieve the required compression ratios for operation of the turbine. Because each compressor rotor may be driven independently and at different speeds, the engine may be used more efficiently at different stages of the flight envelope.

Figure 2:
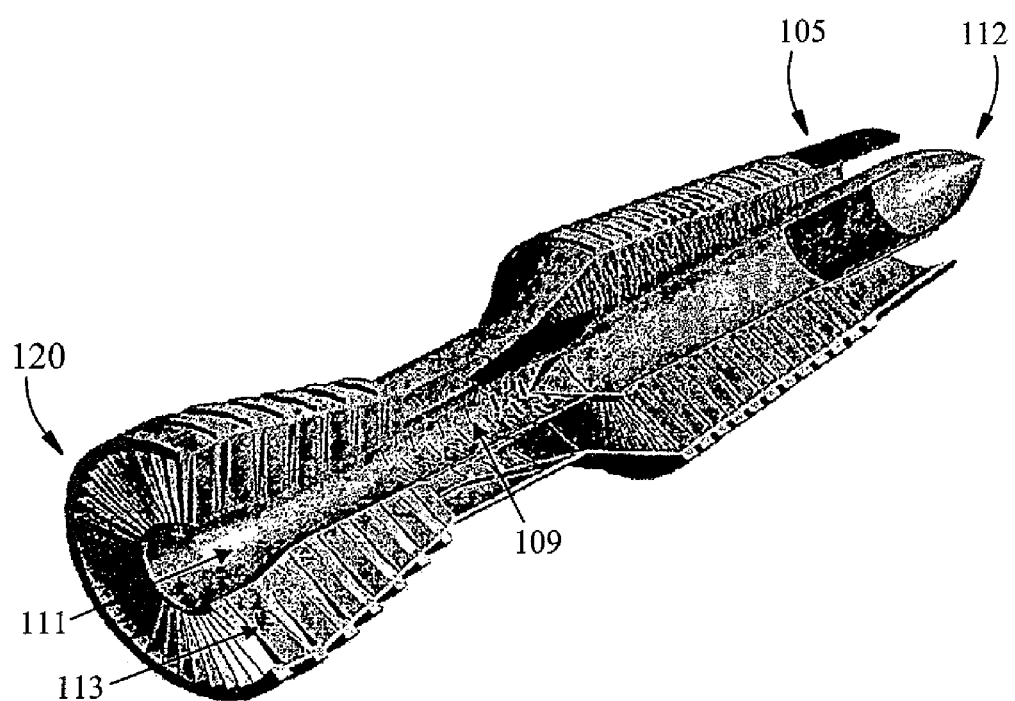
FIG. 2 illustrates a Cross Section of the AHMJET technology of the present invention.

FIG. 2 illustrates a cross section of the AHMJET technology of the present invention. The intake 120 contains the hypersonic compression ram 111. The rotors 113 are depicted on this proximal side of the jet-electric turbine. At the center of the turbine, combustor 109 is positioned. The hypersonic compression ram 112 is shown along with velocity gate exhaust mechanism 105.

The use of an electric ring motor 106 to drive a compressor rotor 113 enables the compressor rotor 113 to generate higher torque than a shaft driven compressor rotor 113 (because the compressor fan rotors are being driven from the tip of the blade at the circumference of the rotor 113 rather than from the root or hub, (and the leverage moments required to overcome mechanical loading are in an order of magnitude less) and enables the compressor stage to move larger amounts of the required mass air flow (due to the disc loading being raised and RPM and mass air flow optimized) and to feed the combustor 109 and turbine than in the case of a shaft driven compressor rotor.

Figure 3B:
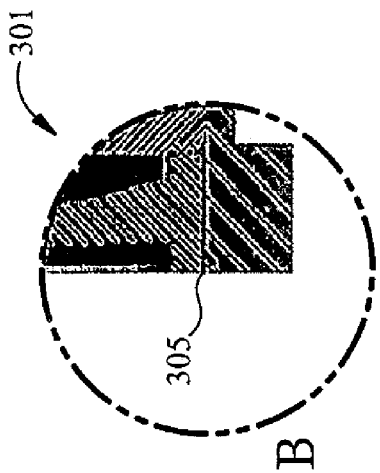
FIG. 3B illustrates an enlargement of the magnetic levitation gap depicted in 3D.
Figure 3D:
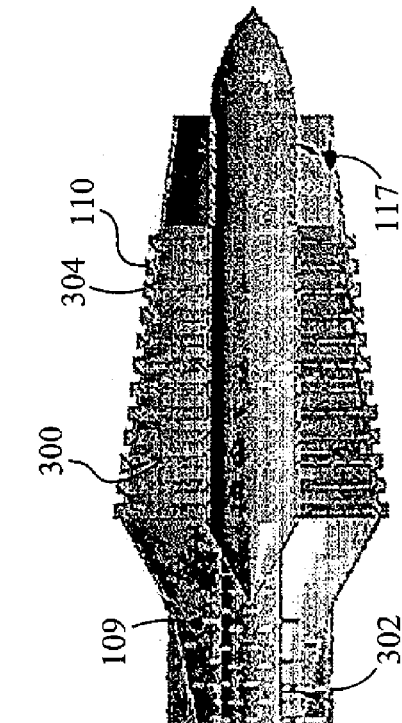
FIG. 3D provides an additional view of the components of the jet-electric turbine.
Figure 3A:
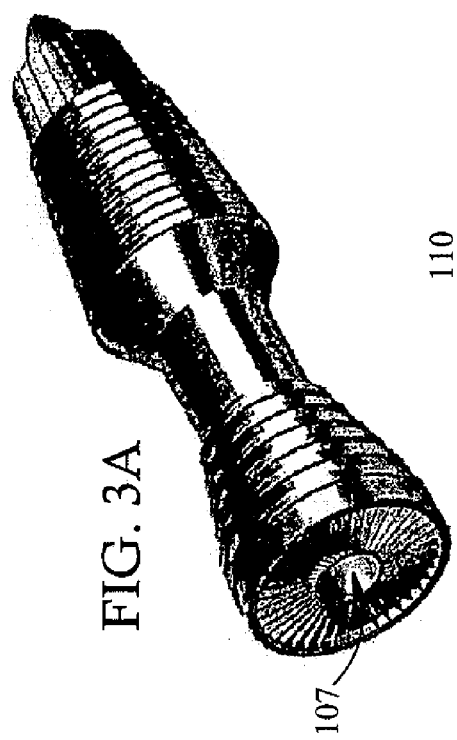
FIG. 3A illustrates a three dimensional View of the Advanced Hypersonic Magnetic Jet Electric Turbine (AHMJET) of the present invention
Figure 3C:
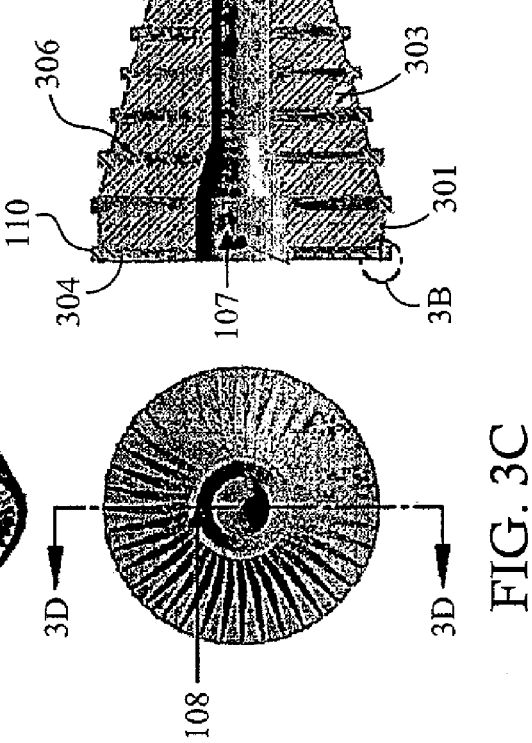
FIG. 3C illustrates a view of the proximal end of the jet-electric turbine of the present invention.

A three-dimensional image of the jet-electric turbine is shown in FIG. 3A. FIG. 3B shows the detailed magnetic levitation gap 305 in enlarged section 301. The frontal view of the proximal portion of the turbine can be seen in FIG. 3C, wherein petal cone aft 109 protrudes from the intake section. Section A-A of FIG. 3C is illustrated in detail in FIG. 3D. Section B or 301 containing the magnetic levitation gap is illustrated herein. Armatures 304 are viewable on the outermost portion of the compressor blades 306 and turbine blades 300. The compressor blades are situated on rotors 113. Diffuser 302 is centered between each rotor 113. Fuel injectors 302 lead to the combustor 109.

A further advantage of the electrically driven compressor is that rotational speed of the rotor stages does not suffer from spool up or spool down time (the time spent increasing or decreasing the rotational speed of the drive shaft) as is the case in traditional turbine designs, and the speed of the compressor rotors 113 can be more quickly adjusted to achieve optimum performance of the engine based on different flight conditions, airframe loads, and optimal combustion performance. Polytrophic efficiencies of the compressor and turbine are expected to be 95 percent or better.

With each fan blade compressor section being independent of the other compressor stages may be optimized aerodynamically, and compressed air ratios, fractional and mass air flow flows can be optimized to each flight condition (idle, acceleration, afterburner, cruise, super cruise, deceleration, landing), maximizing the efficiencies of the compressor. In such circumstances, the electric compressor turbine engine functions as a mass-flow dynamic device, separate from the diffuser stages, combustor 109 and turbine. The electric compressor is ultimately used as a throttling and engine cycle mechanism, and its velocity is independent of the turbine engine, but contributes largely to achieving required compressor ratios for combustion, mass air flow, by-pass air for thrust, and optimal fuel burn. This permits high compression ratios and finely tuned air pressures, engine cycle efficiencies independent of combustion, consistent fuel burn, effective temperature operation and cooling. Higher energy levels are achievable, and broader flight envelopes are possible because the compressor stage acts independently.

Altitude and temperature constraints are optimized to all flight conditions. The AHMJET turbine is designed to achieve the ideal compression, combustion and burn efficiencies at altitude, and or at sea-level, regardless of air density and moisture, thus generating higher thrust (and speed) at given altitudes compared to current generation turbine systems. Because the compressor and diffuser can be run electrically independent of the turbine, engine efficiencies and thrust do not have to decline at altitude as the compression function is now independent of turbine driven function. Compressor speeds can be controlled independent of turbine output through electrical power into the Maglev exoskeleton coming from the Gas Flow Drive.

High specific thrust occurs at a low cross-section, opening new airframe integration opportunities. Decoupling the AHMJET compressor, diffuser, combustor 109 and turbine in an exoskeleton turbine architecture allows for electrical compressor operation (powered by the Gas Flow Drive) independent from the diffuser and turbine, and electrical diffuser operation, separate from the combustor 109 and turbine; thus enabling the increase in compression through frictionless high rotating speeds, that are demanded to dramatically increase air pressure ratios into the turbine, and increase cooling ratios, which results in higher combustion efficiencies and thrust, and provides a very wide operating envelope, thus wide flight envelop for the air vehicle.

Combustor exhaust flow remains associated, maximizing energy for the MHD generator. There is an avoidance of oxygen rich/fuel lean throttle settings and compressor stall/surge events. AHMJET gas by-products may be more tightly controlled and reduced in the Maglev Turbine at high altitudes where typically significant amounts of $CO_2$ and NOX are produced in combustion. With compressor function being independent of turbine function, more complete combustion processes are available; and oxygen rich and/or fuel lean fluctuations can be avoided.

The configuration of the invention not only provides thrust as by-pass air around the combustor 109 but also acts as a supercharger to the turbine. To achieve a supercharging effect on the turbine, mass air-flow is accelerated exponentially, in relation to the velocity of the air in question, at any given rate of change in time (delta). The supercharging effect upon the turbine is due to the more optimized pressures (from independent adjustable rpm on the electrically driven compressor stages, and now optimized aerodynamics and compressor airfoil designs) now achievable by the electric compressor, which can be tuned to the flight condition and altitude for which the electric compressor fan is designed. The hub or drive shaft is eliminated in this configuration.

If electric ring motors 106 are used, the elimination of the hub portion of the rotor 113 is possible, thus enabling the generator to be attached to the drive shaft or encased within the area of what used to be the drive shaft, and located in the space at the hub of the rotor 113 formerly occupied by the compressor rotor hub, to which the rotors 113 were connected. The load bearing surface for the compressor stages is now at the outer circumference of the compressor stages. This design configuration has not been done before in an electrical compressor for a flight engine, but such a design allows for the compressor rotors 113 to be "loaded in compression," rather than in extension and lower tensile strength materials such as composites can be used, which leads to a lower structural weight, lower inertial moments to overcome, and more effective use of materials and horsepower. Additionally, with the drive shaft removed in the compressor section and a "donut hole" available for the generator in the center of the rotor 113, rotating components in the compressor section of the engine are induced to less "cyclic fatigue" load producing paths, which result from the acceleration and deceleration of rotating machinery attached to drive shafts.

Massive power generation occurs across all flight regimes (10.0-12.0 MW+). There is also a reduction of weight through a high percentage of ceramic matrix composites in exoskeleton. The invention allows for the reduction in the number of rotor/diffuser compressor stages (because the compressor cycle can be more efficiently designed to meet given compression ratios with fewer stages), which means that the weight of the compressor (and therefore of the engine) is reduced.

The configuration of the present invention also leads to the electrification of auxiliary machinery, and incorporation into the AHMJET machine interior. Tight airframe integration enables use of fuel as a heat sink for passive thermal management. High electric power is present for onboard subsystems and payloads (e.g., directed energy weapon).

The electric distribution architecture between the compressor combustor, MHD generator is as follows. If the generator is enclosed within the hollow drive shaft, stationary diffuser stages (alternating between rotors 113) may act as conductive pathways to power the ring motor magnetics at the outer rim of each compressor rotor 113. In this configuration, each compressor rotor stage is adjacent to an electrical conductive pathway diffuser stage and can be run independently of the others with motor controllers 100 at the outer ring of each stage. This configuration of forming electrical conductive pathways in rotational turbomachinary components is also novel and unique. This configuration of the electrical compressor allows for aerodynamic optimization to meet compression ratios otherwise thought to be unachievable with a fixed drive shaft driven compressor.

FIGS. 4A through 4D illustrate exemplary features of the rotors and stators of the preferred embodiment of the present invention. FIG. 4A shows a three-dimensional view of the rotor/stator section of the turbine. The rotors 113 are shown circumferentially bordering the air inlet 107. FIG. 4B contains an enlargement 400 of a section B wherein an inward air thrust 401 moves against rotor 113. The rotor direction 402 is perpendicular to that of air thrust 401. Adjacent to the rotor is the stator/diffuser 303. FIG. 4C shows the frontal view of the three dimensional view presented in FIG. 4A. An illustration of the compressor stage is presented in FIG. 4D, in which the section enlarged in FIG. 4B is contained.

The electric compressor can house a magnetic air bearing between each compressor stage (rotor 113) and diffuser (diffuser) in the compressor trunion. The electromagnetics are embedded and integrated into the outer ring of each compressor stage (rotor 113) and electricity passes across a magnetic flux generated at the rotor compressor/diffuser interface propelling that compressor stage. AC current is produced in a conductive hot exhaust flow from the turbine via magneto hydrodynamic drive (MHD). The magnetic flux created from a seeded conductive hot, high speed jet exhaust passing conductive magnetic plates 117 in the exhaust nozzle casing increases exponentially with the hot gas exhaust velocity with kilowatt levels of power produced. Hot gas combustion is seeded with a positively charged seeding ion (e.g. selenium) in powder form stored on board the air vehicle. The combination of conductive hot gas exhaust generating a powerful magnetic flux by passing an embedded arrangement of magnetic plates 117 in the jet nozzle wall to power the electric compressor at the front of the turbine is unique and novel.

Electric power is fed from the embedded magnetic plates 117 of the exoskeleton to the inner wall of the stationary shaft-less diffuser stages, driving the air bearing (maglev) suspended adjacent compressor stages. The shaft-less "donut hole" becomes a cooling channel to dissipate heat via convection and radiation generated by the magnetic flux interface of the rotating rotor stage (compressor) passing the conductive stationary diffuser stage. The electric compressor in this iteration is the generator. It is driven by electric power generated by magneto hydrodynamic drive (MHD) in the turbine via seeding the hot exhaust with a conductive ion.

The Design Approach

Increased performance and weight costs down has been the focus on gas turbine technology development in the last 20 years (Integrated High-Performance Turbine Engine Technology—IHPTET Program). Government and military supported programs have focused on ceramic components for the hot section components of gas turbine engines where they enable higher turbine inlet temperatures and, therefore, higher thermal efficiencies. However, these development programs have focused on 50 year old gas turbine technology, rather than a clean "sheet design approach", integrating propulsion and electric generation systems providing the potential of very high thrust capabilities, energy generation, and an order of magnitude increase in propulsion efficiency across future flight regimes of multi-mission aircraft.

The DOD and Armed Services are now demanding significant increases in electric output from in turbine flight engines, from 5.0 Megawatts to 20.0 Megawatts, to power on-board energy weapons and all electric aircraft subsystems. Currently, US Air Force, Navy and Army Aviation requirements for future unmanned and manned systems are demand propulsion capabilities which do not exist yet or are in research and development phase. These propulsion requirements are for rapid acceleration from subsonic to sustained hypersonic speeds (Mach 0.3-Mach 5.8+) for long range deep strike and persistence capability, delivering high power electric energy for Directed Energy Weapons (DEW), all electric aircraft subsystems, and managed through sophisticated electric power management architectures for aircraft function.

In the traditional layout form of a compressor, combustor 109 and turbine propulsor, dynamic components are so designed to be in tension, with heavy axially loaded drive shafts, and gear boxes, which form the basis of limited thrust to weight ratios typically in the order of no more 5-6 to 1. Turbomachinary design, therefore, to increase performance, just in terms of weight, must turn to machine systems where light weight hollow-core structures using highly alloyed single crystal titanium materials can be used, and lightweight high temperature ceramic matrix composites (CMC) materials can further enhance weight savings. In order to do so, these materials must be designed into a favorable, but highly loaded, dynamic turbomachinary component operating environment. The operational environment (temperature, pressure, speed) is one where the material benefit of single crystal metal alloys and CMC's may be observed. Thus, the starting point for turbomachinary design must put rotating dynamic systems components (compressor-stator/rotor 113, turbine, and gas generator) which are normally in extension, into compression.

To achieve this design point the turbine concept is turned "in-side out (an exoskeleton turbomachinary design)". In such a configuration the drive shaft can removed and the associated weight with it. The medial end of all the turbomachinary components are attached to a lightweight CMC or titanium load ring, and the load bearing structure is moved to the outer casing. The distal end of the rotating turbomachinary components in this concept are integrally molded with CMC structure, or fusion welded in the case of single crystal alloy titanium, to the magnetics trunion case which faces the coil and magnet outer casing wall (to be discussed further on in this paper).

The AHMJET of the present invention demands that a bearing-less, load bearing structure is used to reduce weight, electromagnetics technology is embedded within it, and air bearing technology (magnetic levitation) is utilized to provide a frictionless magnetic levitation loaded surface to suspend the rotating compressor, diffuser and turbine from the outer casing wall in the AHMJET concept. Magnetic levitation air bearing technology in this concept works on the principle of a series of magnets embedded in the outer structural casing of the rotating compressor (rotor 113/stator) and turbine using embedded composite neodium/boron permanent magnets of opposing magnetic flux and propulsion coils in the outer loaded casing, generating opposing magnetic forces.

An outside power source is used to start the AHMJET turbine system. Current is AC, and can be redirected into DC current so that the magnetic levitation component also generates electricity. The ground power source is removed once the turbine reaches combustion at idle and the compressor/turbine is rotating and generates electricity to the magnetic air bearing, suspending the engine core. Energy density and generation capacity can be extremely high since rotational speeds may now be very high (60,000 to 80,000 rpm for a 30,000 lb. thrust prototype turbine) at the outside of the exoskeleton non-bearing surface, where the permanent coils and permanent magnets are located. The gap between the surfaces is very small, less than 1 mm. The exoskeleton AHMJET turbine concept is self-perpetuating and sustaining. It's two functions are to provide a large compression load bearing surface, and to generate electricity.

In order for magnetic levitation to work power to the coils embedded in the outer casing of the exoskeleton must be an opposed charge to the composite neodium/boron permanent magnets of the rotating components embedded in the trunions (distal end component structures of the rotor 113/stator and turbine) to suspend these rotating turbomachinary components from the outer wall casing, with all directional centrifugal loads in compression.

To exploit an exoskeleton turbine design ceramic components can be substituted for metal components with only minor design changes to accommodate the brittle failure mode of ceramics. This reduces weight and allows for design of the thermal cycle and combustion temperatures to be higher than current turbine technology because of the higher thermal cycle material characteristics of ceramics. Higher thermal cycle temperatures produce higher thermal efficiencies and reduce fuel burn at the same thrust levels allowing for greater combustor, and thus propulsion efficiency. The compressive strength of ceramic materials which can be used in the compressor and diffuser vane, stators, and turbine blades are typically a factor of 10 higher than the tensile strength, suggesting the adoption of designs in which rotating ceramic components go into compression as they spin-up, this further benefits weight reduction of turbine components.

This advanced materials design approach suggests using ceramic blades placed on the inside of rotating cylinders rather than blades attached to a rotating shaft. An engine of this design is referred to as either "exoskeleton" or "inside-out" designs. Novel compression and combustion machine designs in AHMJET are possible because of the use of CMCs including: utilization of air or magnetic bearings; radial staging of rotor 113 and stator (compressor) sections; and high power density ring motors 106 and generators to power fan and compressor stages, and generate power from turbine sections and magneto hydrodynamic drives to operate the ring motor bypass fans and compressor. Accommodation of steady-state and transient thermal stresses is particularly important in ceramic engine components. Exploiting rapid prototyping methods that build ceramic or metal components without part-specific tooling and which can be modified to spatially control composition, is useful in producing surface compressive stresses and thermally insulating surface layers.

Commercially available gas turbine engines in this power range are typically less than 35% efficient. This design approach could allow for efficiencies in the 40%-45% range as ceramic designs in compression provide higher thermal efficiencies, higher operating temperatures, and higher rpm (60,000-80,000 for bearing-less magnetic levitation) generation motors reduce friction to zero (parasitic drag approaches zero), increasing energy density and increasing watts per horsepower of electric generation (1200 watts/HP vs. 740 watts/HP). As thrust is more independent of energy generation due to a non-mechanical design in AHMJET (shaft-less design and MHD gas drive generator) thus thrust losses are minimized. Since power density of electric propulsion-motor generators, as with AHMJET, increases with rotational speed, this Maglev gas turbine can be particularly effective as both a propulsion energy generation system.

A detailed description of the stages of the operation of the jet-electric turbine of the present invention will be presented below with reference to the drawings.

The preferred embodiment of the present invention incorporates a dual intake 120 at the fan face of the AHMJET turbomachinary, as set forth in FIG. 1. Air is taken in at the fan face of the compressor, and in the central "donut hole" tunnel, which the forms the I.D. of the exoskeleton. The "donut hole" tunnel becomes the scramjet inlet above a calculated velocity of 2.8 Mach to sustain hypersonic combustion (combustion occurs with fuel due to pressure and velocity of the air at the combustor 109) rather than turbine machinery combustion. The compressor stages are made up of a rotor 113 and stator 115 which are "de-coupled" electrically through the AHMJET segmented "bearingless" exoskeleton. This stage electrically "de-coupling" allows for air compression, air velocity, air pressure differential (diffusion) and air-fuel mixing to be managed more sequentially in terms of pressure ratio creation and optimization prior to the combustion stage, and subsequent turbine operation for thrust.

The AHMJET technology of the present invention involves the evaluation of a 35,000-40,000 lb. thrust electric turbo machine. This further involves integrating other propulsion technology concepts into turbomachinary propulsion, and combustion thermodynamics, taking the approach of new baseline design integration and turning the engine inside out. The compressor increases the pressure of the incoming air so that the combustion process and the power extraction process after combustion can be carried out more efficiently. By increasing the pressure of the air, the volume is reduced, which means that the combustion of the fuel/air mixture will occur in a smaller volume.

The compressor functions as a separate mass dynamic flow stage because of the ability for electric coupling and de-coupling, from the turbine, by ways of the magnetic air-bearing, MHD gas generator, and propulser. Thus, where turbines function on the ratio of compressed air achieved from ambient air densities, to achieve combustion, rather than air velocity, the compressor in the AHMJET design is used as a throttling and engine cycle mechanism, fine tuning air pressure, air velocity, engine cycle, temperature and cooling. Higher energy levels are achievable by the AHMJET driven compressor stages advancing at higher rpm's than the turbine (compared to current technology where the compressor runs at the same speed as the turbine because both are attached to the same drive shaft), driven by the electric power coming from the MHD gas generator behind the turbine and conducting plates in the exhaust stream.

The rotating stall may consist of one or multiple cells that rotate around the compressor at an angular speed which is a fraction of the rotor speed. This instability results in a loss of compressor performance that may require the shut down of the engine to clear. Operating a compressor in rotating stall can contribute to fatigue damage of the blading resulting from the rotating stall unsteady aerodynamic loading. Also, the loss in performance due to rotating stall can also move the compressor to an operating point where surge is initiated.

The AHMJET technology of the present invention can avoid surge conditions since the compressor stages are run individually. Each has an electromagnetic motor drive, is shaftless, and is suspended in electromagnetic equilibrium with the magnetic levitation air bearing conceived in the trunion and turbine outer exoskeleton. Individual rotor and stator stages, controlled independently and air pressure and thermal temperatures monitored with embedded sensors is the preferred prevention design of AHMJET as it relates to compressor stall and surge. Compressor stages can be sped up or slowed down in AHMJET accordingly to manipulate mass airflow and avoid onset of surge and over spinning of RPM.

The Euler Equation is used to describe the flow of a calorically perfect gas through a centrifugal flow compressor as is the case for compressor stages in the AHMJET engine with axial gas flow entering such that:

$$Tt3-Tt1=v2Ut/GcCp \qquad \text{Equation 1}$$

Ideally, the fluid, or gas leaving the rotor wheel has a swirl velocity v2 equal to the rotor 113 speed Ut. Due to slip between the rotor 113 and fluid (or gas) the fluid leaving the rotor wheel attains only a fraction of the rotor speed. The ratio of the exit swirl velocity to the rotor speed is called the slip factor "e".

$$"e"=v2/Ut \qquad \text{Equation 2}$$

The slip factor relates to the number of vanes on the rotor 113 of the electric compressor and its stages in the AHMJET. As the number of vanes "n" increases, the slip factor approaches 1 and the frictional losses of the rotor 113 increase. In the AHMJET design there are no mechanical bearings, only magnetically levitated "air bearings", therefore frictional losses are almost zero and vane numbers on the rotor 113 may be increased to raise the compression ratio to higher ratios than seen in traditionally designed shaft turbines (as compared to shaftless turbines as in AHMJET. Selection of the number of vanes in relation to AHMJET comes down to a high slip factor approaching 1, and frictional losses are not accounted for and formed to a constant of "0". A useful numerical correlation between the slip factor "e" and number of vanes "n" is $$"e"=1-2/n \qquad \text{Equation 3}$$

Or as in the case of a frictionless magnetically levitated ring motor driven compressor stage made up of rotor 113 (vanes) and stator:

$$"e"=1>\text{or}=2/n \qquad \text{Equation 4}$$

Substitution of Equation 2 into Equation 1 gives a relationship of compressor temperature rise in terms of the rotor speed Ut, and the slip factor "e".

$$Tt3-Tt1=eU2t/GcCp \qquad \text{Equation 5}$$

By using a polytrophic compressor efficiency Ec and Equation 5, the compressor pressure ratio can be expressed as $$Mc=Pt3/Pt1=(1+EU2t/GcCpTt1) \text{ to the order of the power: } Yec/(y-1) \qquad \text{Equation 6}$$

From Equation 6 compressor pressure ratio Mc can be plotted versus rotor speed Ut for air<y=1.4, Cp=1.004 Kj/(kg·K)> at standard conditions (Tt1=288.16 K) with a slip factor "e" of 0.9999. For rotors 113 of light alloys this high slip factor is not possible, and one of 0.8-0.9 is only possible with rotor speed maximums of about 1500 ft/second, by the maximum centrifugal stresses of the rotor 113 with subsequent corresponding compressor pressure ratios of about 4.0. With the AHMIET technology with the "exoskeleton" shaftless design, with magnetically levitated "air bearing" rotors/stators 113 (description of a single compressor stage being of a rotor/stator, of which in the described design there are eight) can be manufactured of actively cooled, "hollow" hafnium carbide, fiber reinforced, ceramic matrix composites as centrifugal forces do not exist as the rotors/stators are in compression, not extension where centrifugal forces originate from.

Hence compressor and rotor speeds may be increased to 2500 ft/sec.-3000 ft/sec. almost double with higher blade count and lighter higher temperature materials (fiber reinforced ceramic matrix composites) and subsequent higher compressor pressure ratios in the range of 10.0-12.0. These very high compression ratios are only attainable where rotor speeds can be raised dramatically and the slip factor can be brought up to 1.0. The only way to achieve this is to put the turbomachinary components in compression (not extension) with a shaftless design and then high rotational speeds are possible with compressor ratios 40%-50% higher than in current state of the art designs.

The design of multistage axial compressors is mainly based on 2D-methods, in the case of this design approach 8-stage compressors will be evaluated. In order to gain increased Mach number levels and reduced profile losses, controlled diffusion airfoils (CDA) are realized in this new turbo machine design concept. The close relation between unsteady flow effects and loss prediction is well known in diffuser design dynamics (Schulz 1990). Large stator hub corner stall cells occur with traditional turbo machine design and are even observed under steady conditions, along with wakes and periodic fluctuations generated in front of the stator. In the AHMJET turbine concept there is no large center hub to create corner stall, as the design concept is shaftless, thus separation regions do not occur due to there being none existing in the design. Typical end wall losses are eliminated as the diffuser rotates against the outer wall exoskeleton casing by being embedded in the trunion anode of the AHMJET section of the compressor. Also, unsteadiness in the boundary layer and from clearance vortices is eliminated as the diffuser is one integral component, the rotor 113 and stator tied integrally to the AHMJET outer exoskeleton trunion. Diffuser clearance is a non issue (diffuser integral to exoskeleton trunion wall), which typically has contributed to large mass flow production losses, with heavy impact on main air flow.

This behavior is caused by high blade loading due to positive incidence angles and a high inlet Mach number as design speed is maximized. Now blade and diffuser loads are concentrated in a distributed compressive force, not one of tension as with shafted turbines. Characteristic rise of suction side profile losses for CDA-blading is minimized as diffuser stages/compressor stages are electrically phased in-or-out during run times, maximizing engine cycle efficiencies and reducing aerodynamic losses. The best efficiency with 90.9% can be found at 94% speed. While at lower speeds the stage matching gets worse and avoids a better performance of the machine, higher speeds cause the increase of circumferential velocity and Mach number level with the consequence of decreasing efficiency.

The burner sits between the compressor and the power turbine. The burner is arranged like an annulus, or a circular doughnut. In this concept the burner combines the benefit of an annular combustor 109 with the liner sitting inside the outer casing and atomizers are so designed to maximize separation between fuel molecules and low velocity swirl. This swirl characteristic provides control of the flame front, marginalization of combustion temperatures down the length of the combustor 109, and effective mixing of core bypass air doming from the shaftless center of the turbine.

Stators 115, also known as guide vanes, control mass air flow onto the turbine disks at the correct angle to maximize the airflow, maximizing thrust. Guide vanes are designed to absorb all the pressure and temperature fluctuations coming from the combustor 109 in order to get the most out of the airflow and meet engine operating and design requirements. They establish laminar airflow from turbulent flow from the end of the flame front to the first turbine blisk (disk, power turbine, by-pass air and annulus cooling air of the combustor 109)

A multi-stage, 4-stage configuration is desired to maximize thrust and efficiency. Based on a proposed engine class of 20,000 lbs., twelve turbine stages are incorporated into the present invention with eight compressor stages. The turbine is supported on the inner shaftless ring drive and the outer trunion casing, rotating freely within the magnetic field of the AHMJET system.

The exhaust cone 112 houses the magnetics 117 and 118, coils 110 and seeding flows 104 for alkaline distribution to charge the high velocity exhaust flow for the Gas Flow Generator (MHD). Seeding will occur just upstream of the last turbine stage where velocity is lower. The exhaust 112 maintains velocity flow from the last turbine stage to the end of the exhaust cone. Afterburner capability could be possible, integrated into the fuel feed upstream at the combustor 109.

The trunion casing 114 extends the lengths of the turbomachinary where there are dynamic rotating components, this includes the compressor, stator/diffuser 115, turbine and MHD. It contains integrally the distal ends of all the shaftless turbine components. The trunion houses the magnetics for the Maglev Systems.

The Maglev Turbomachinary consists of an inner and outer exoskeleton. A generated magnetic field from the Gas Flow Generator (MHD) suspends the inner turbine core from the outer magnetized/coil outer casing to a tight tolerance (approx. 1 mm)

Figured-8 levitation coils are installed on the inside sidewalls of the outer casing. This arrangement comes form Maglev trains and provides a high level of inductance. When the neodymium iron boron permanent magnets embedded in the compressor, diffuser, turbine section trunions holding the distal ends of the rotating components, pass at high speed and in close tolerance above the center of these coils, an electric current is induced within the coils, which then act as electromagnets, as a result, there are forces which push the superconducting magnets in the compressor case trunion (and all inner ceramic rotating components which are integral to the trunions) and simultaneously center it and levitate it.

The magnetic air bearing is designed around two separate criteria. To provide the shear pressure necessary to meet the power requirement and establish a magnetic bearing capable of meeting axial, in-plane and out-of-plane loads. Two basic designs for the magnetic bearing are considered here. An active bearing for control through algorithm software sensor controls to the FADEC (full authority digital engine control) is used against the generated electromagnetic fields, manipulated by an embedded controller 100 tied to the algorithm software through aerodynamic eddy-current sensors, pressure sensors in each compressor ring motor and/or turbine generator ring motor.

A ground based power supply is used for starting until the MHD gas generator in the turbine generates enough electricity to run the electric compressor/magnetic air bearing fore and aft, and the AHMJET is self sustaining. The levitation superconducting coils are connected all the way around the inside perimeter of the outer stationary turbine casing. In operation of the AHMJET system, a repelling force between the turbine rotating component trunions and the outer casing guide way keeps the rotating component sections at the center of the outer casing. The stator coils embedded in the outer casing guide ways will be designed using superconducting wire. Several chemical combinations are possible in the AHMJET design which are novel and have not been done before in magnetic turbine machinery using superconducting wire. YBCO, for its constituent elements: yttrium, barium, copper, and oxygen will be explored as a superconductor coil. Hybrid superconducting magnetic materials, such as neodymium iron boron permanent magnets shall be explored which shall be implemented into the compressor, diffuser, turbine section trunions holding the distal ends of the rotating components.

The superconducting/electromagnetic hybrid bearing will be designed using active radial electromagnetic positioning and a superconducting passive axial levitator technology. The design approach would use a multi-pole design, the number of which will be defined by the electromagnetic density an d the axial length of each compressor stage and turbine stage which will be constrained by the lass air-flow of the design. Two-phase induction machine design using specially designed stator windings for delivering torque and radial positioning simultaneously will be utilized for positioning control. The radial bearing will use four eddy-current sensors, displaced 10° from each other around the 360 degree circumference of the casing, for measuring the shaft position and a PID control system for feeding back the currents.

An electronic control algorithm will be used for the companies ring motor technology which shall be derived to a mathematical derivative to control the clearance tolerance so that it remains constant to a nominal 1.0 mm, +/−0.1 mm. The levitation system is supplied from an off-board ground station to start, until electric generation capacity from the MHD in the combustor 109/turbine section supports the electric compressor/air bearing requirements. Beyond startup the AHMJET is self sustaining for its electrical requirements.

The synchronous long stator linear magnetic motor is used both for propulsion of the rotating trunion exoskeleton inside the casing and for magnetic levitation (air bearing) of the trunion structure away from the outer casing wall. It functions like a rotating electric motor whose stator is cut open and stretched along the circumference of the inside of the exoskeleton. Inside the motor windings, alternating current is generating a magnetic traveling field which moves the compressor, diffuser or turbine component trunions of the exoskeleton, levitated and propulsed inside the outer casing. Support magnets in the trunions function as the excitation portion (rotor 113).

Speed can be continuously regulated by varying the frequency of the alternating current. If the direction of the traveling field is reversed, the motor becomes a generator and provides additional power off the turbine and adds to the MHD capacity. Braking energy can be realized as the turbine speed is slowed as necessary through the flight regime (i.e. during landing, loiter, etc.) by fuel burn adjustment and can be re-used and fed back into the electrical turbine network through a proprietary capacitance energy storage bank technology.

Magneto Hydrodynamic Drive of the Exoskeleton Turbine

A magneto hydrodynamic drive (MHD) generator is used to electrify the hybrid exoskeleton turbine and airframe, providing high power for the magnetic air bearings (magnetically levitated compressor of 8 stages, and turbine generator, of 4 stages) and directed energy weapons, and all electric subsystems on board the aircraft.

The MHD generator is established with concentric magnetic coils at the diverging exhaust nozzle of the engine. Because the exhaust gases passing through the nozzle are in an ionized condition, it is possible to generate an electric current. Typically the higher the mach number of the gas exhaust, the more electric power that can be produced from the free gas stream. There are a variety of gases with a chemical compound containing an alkaline metal to make conductive plasma within the stream. Seeding the working free gas stream with small concentrations of potassium or selenium provides the necessary number of free electrons to generate electric power from the MHD. The seeding density is calculated from the exhaust gas flow velocity, exhaust temperature, and the time across a specific mission envelope of which this engine would be utilized in. Other possible seeding materials for this application having a relatively low ionization potential are the alkali metals, cesium or rubidium. An MHD generator, like a turbo generator, is an energy conversion device and can be used with any high-temperature heat source-chemical, nuclear, solar, etc.

The production of electrical power through the use of a conducting fluid moving through a magnetic field is referred to as magneto hydrodynamic (MHD), power generation as aforementioned earlier. When an electrical conductor is moved so as to cut lines of magnetic induction, the charged particles in the conductor experience a force in a direction mutually perpendicular to the B field and to the velocity of the conductor. The negative charges tend to move in one direction, and the positive charges in the opposite direction. This induced electric field, or motional emf, provides the basis for converting mechanical energy into electrical energy. At the present time nearly all electrical power generators utilize a solid conductor which is caused to rotate between the poles of a magnet.

Because MHD power generators do not require the use of moving solid materials in the gas stream, they can operate at much higher temperatures than other types of electric generation machines. Calculations show that a gas fired (Jet-A, Kerocene, hydrogen) MHD generator designed to the AHMJET technology may be capable of operating at efficiencies between 40 and 50 percent.

The essential elements of a simplified MHD generator, typically referred to as a "Continuous Electrode Faraday Generator", are a field of magnetic induction B applied transverse to the motion of an electrically conducting gas, flowing in an insulated duct with a velocity u. Charged particles moving with the gas will experience an induced electric field, u×B, which will tend to drive an electric current in the direction perpendicular to both u and B. This current is collected by a pair of electrodes, or in the case of the AHMJET Technology, embedded magnetic plates 117 internal to the wall of the combustor 109 and exhaust duct, on opposite sides, in contact with the gas and connected externally through a load. Neglecting the Hall effect, the magnitude of the current density for a weakly ionized gas is given by the generalized Ohm's law as;

$$J = u(E + u \times B).$$

Where:
Motion of an electrically conducting gas flowing at velocity 1000 m/sec=U;
Field of magnetic induction=B;
Induced electric field, perpendicular to both u and B, of charged particles=U×B;
Electrical power delivered per unit volume load of an MHD generator gas=P;
Magnitude current density of ionized gas is given by Ohm's law J=u(E+u×B);
Coordinate system of an open circuit of AHMJET MHD is Jy=0;
Open circuit electric field=uB;
Electric field in the "Y" direction of the coordinate system is=Ey=0;
Theta is a constant and is uniform thus="a";
Short circuit current is Jy=−auB;
The loading parameter where K is the load of the current=Ey/uB;
Electric power delivered to the load per unit volume of the AHMJET MHD is P=−J·E (negative sign denotes that the conventional current flows in the negative Y direction);
The electric power delivered to the load per unit volume for the generator shown in FIG. 1. is P=au2B2K (1−K), where (2=squared); and
Power density maximum value is: Pmax=au2B2/4.

The electric field E, which is added to the induced field, results from the potential difference between the electrodes. In the case of the AHMJET technology the potential difference is the surface area, A, times the axial length, Al, of the conductor magnetic plate, which defines the volume, of which the velocity, V, of the plasma (charged ion gas) moves through it, creating an induced field resulting from the potential difference between the anode and cathode (electrodes). Since the AHMJET magneto hydrodynamic drive is basically a segmented Faraday generator, (four magnetic plates on either side of the plasma flow making up the anode and cathode) and extend the entire length of the exhaust duct, they tend to impose a equipotential surface in the gas which are normal to the y-direction. For the purposes of discussion in this section on the MHD drive of AHMJET, we shall assume that both u and u are uniform. In terms of a coordinate system, we have that;

$$Jy = u(Ey - uB).$$

Because the electrodes in a MHD generator of this type for the AHMJET Technology extend the entire length of the duct, they tend to impose equipotential surfaces in the gas which are normal to the y-direction. In accordance with the above equation the electrical power delivered to the load per unit volume of the MHD generator gas proposed in this application is;

$$P = -JE.$$

It follows that J=−E'=−O'uB(l−K) y 1+p2 y 1+p2'−pO'

The Hall effect reduces J y and P by the factor (1+P2) and results in the appearance of a Hall current which flows downstream in the gas and returns upstream through the electrodes. The reduction of J y and P is caused by the fact that the uB field must overcome not only the Ey field produced by the electrodes, but also the Hall EMF (electrode magnetic frequency) resulting from the current flow in the x-direction.

To circumvent the deleterious consequences of the Hall effect, the electrodes may be segmented in such a manner that separate loads occur connected between opposed electrode pairs. In the limit of infinitely fine segmentation, there can be no x-component of current either in the electrode, or in the gas, and so the condition for an ideal segmented MHD Faraday generator in AHMJET is;

$$Jx = 0.$$

For the generator, P=uu2B2K(1−K). This power density has a maximum value for K=½. In accordance with the equation above, the rate at which directed energy is extracted from the gas by the electromagnetic field per unit volume is $-00(J \times B)$. We therefore define the electrical efficiency of a MHD generator as;

$$JoEl1e=0(J \times B).$$

For the generator being discussed, 11e=K. The Faraday generator therefore tends to higher efficiency near open circuit operations as in AHMJET. In order that the MHD generator have an acceptable size and use in this application, The generator should deliver a minimum of about 2.0 MW per cubic meter of gas. Power generation is then directly relational to the sized volume of the exhaust 112 and the exhaust velocity, thus the design limit is in terms of shaft horsepower of the core turbine. This brings back to focus the core concepts of reducing weight, reducing the number of core rotating components, raising core operating temperatures, raising burn efficiencies, and using a segmented turbine with electric phased-lock design operation so the staged AHMJET operating engine conditions can be maximized across the entire flight envelope; ultimately generating 1.5-3.0 times the thrust to weight above traditional turbine designs. In accordance with equation (4.4), the rate at which directed energy is extracted from the gas by the electromagnetic field per unit volume is $-00(J \times B)$. We therefore define the electrical efficiency of a MHD generator as;

$$JoEl1e=0(J \times B).$$

Current densities are anticipated to be in the order of a few amperes per square cm or more, when baseline electric power requirements are set at 12.0 MW, with predicted gas flow rates at average speeds of Mach 3.8, the point of transition whereby turbine compression is switched off and combustion all occurs in the center "donut-hole" inlet and supersonic/hypersonic combustor 109. From preceding research with MHD and steam fired turbine generators equilibrium electrical conductivities at atmospheric pressure with potassium-seeded combustion plasmas, and/or potassium-seeded or cesium-seeded argon plasmas, gas temperatures needed to achieve the condition of 3-5 amperes per square centimeter and 10 MW per cubic meter of gas can be readily obtained from Jet-A, Kerocene and other fossil fuels.

Given known values of the electron Hall parameter for a magnetic induction electrical current, corresponding to gases and conditions in a steam fired or fossil fueled turbine combustor 109 it is apparent that the Hall effect can play a significant role in the operation of an MHD generator. Because of the Hall effect, a current flowing in the y-direction can give rise to a current flowing in the x-direction. Thus Ohm's law is expressed as: the form of equation (9.1), we must now write $$Jy=(E+PEx)$$

or rearranging $$1+\text{"and }Jx=(Ex-PE).$$

To meet the magnitude of power needing to be generated for a superconducting light weight airborne laser electrodes in the turbine duct must extend the entire length of the duct. Thus they tend to impose equipotential surfaces in the gas which are normal to the y-direction. Thus for a continuous electrode Faraday generator we have:

$$Ex=O, \text{ thus following, } J=-E'=-O'uB(I-K)y1+p2y1+p2'-pO', Jx=i+p2Ey=-Ply,$$

Thus rearranging $$O'u2B2p=i--:+p2K(1-K).$$

The Hall effect reduces J y and P by the factor (1+P2) and results in the appearance of a Hall current which flows downstream in the gas and returns upstream through the electrodes. The reduction of J y and P is caused by the fact that the uB field must overcome not only the Ey field produced by the electrodes, but also the Hall emf resulting from the current flow in the x-direction. To circumvent the deleterious consequences of the Hall effect, the electrodes thus may be segmented in the design approach, and separate loads connected between opposed electrode pairs. In the limit of infinitely fine segmentation, there can be no x-component of current either in the electrode or in the gas, and so the condition for an ideal segmented Faraday generator is:

$$Jx=O.$$

Described herein is a higher performance MHD generator for directed energy weapons, microwave weapons that can be fired synchronously through this high electric generation power source thereby mitigating engine failure rates, vibrations, and costs, while at the same time, increasing survivability and operability. This MHD generator will be capable of providing both the power required for the onboard directed energy weapon system and high performance flight speeds and transition across multiple mMach regimes; subsonic, supersonic and hypersonic.

It is shown that in certain cases the Joule heating in a magneto hydrodynamic generator is sufficient for the electron temperature to be raised above that of the heavy gas particles. The practical application of the resulting increase in ionization and hence electrical conductivity is discussed. When an electrical conductor is moved so as to cut lines of magnetic induction, the charged particles in the conductor experience a force in a direction mutually perpendicular to the B field and to the velocity of the conductor. The negative charges tend to move in one direction, and the positive charges in the opposite direction. This induced electric field, or motional emf, provides the basis for converting mechanical energy into electrical energy. At the present time nearly all electrical power generators utilize a solid conductor which is caused to rotate between the poles of a magnet. In the case of hydroelectric generators, the energy required to maintain the rotation is supplied by the gravitational motion of river water.

Turbo generators, on the other hand, generally operate using a high-speed flow of steam or other gas. The heat source required to produce the high-speed gas flow may be supplied by the combustion of a fossil fuel or by a nuclear reactor (either fission or possibly fusion). The production of electrical power through the use of a conducting fluid moving through a magnetic field is referred to as magneto-hydrodynamic, or MHO, power generation.

Magnetic Levitation of the Exoskeleton Turbine

Figured-8 levitation coils are installed on the inside sidewalls of the outer casing. When the superconducting magnets embedded in the compressor, diffuser, turbine section trunions holding the distal ends of the rotating components, pass at high speed above the center of these coils, an electric current is induced within the coils, which then act as electromagnets. As a result, there are forces which push the superconducting magnets in the compressor case, diffuser and turbine trunions, and simultaneously center it and levitate it. A ground based power supply is used for starting until the MHD in the turbine generates enough electricity to run the maglev fore and aft, and the AHMJET is self sustaining. The levitation coils (magnets) are connected all the way around the inside perimeter of the outer stationary turbine casing.

The guidance magnets located on the rotating component trunions, and the embedded superconducting coils in the engine casing walls keep the shaft-less rotating component machinery laterally on the track inside the exoskeleton wall.

The levitation system is supplied from off-board ground station to start, until electric generation capacity from the MHD in the combustor 109/turbine section supports the maglev electric requirements. Beyond startup the MMHET is self sustaining for its electrical requirements. The synchronous longstator linear magnetic motor is used both for propulsion of the rotating trunion exoskeleton inside the casing and magnetic levitation (air bearing). It functions like a rotating electric motor whose stator is cut open and stretched along the circumference of the inside of the exoskeleton. Inside the motor windings, alternating current is generating a magnetic traveling field which moves the compressor, diffuser or turbine component trunions of the exoskeleton, levitated and propulsed inside the outer casing. Support magnets in the trunions function as the excitation portion (rotor 113). Speed can be continuously regulated by varying the frequency of the alternating current. If the direction of the traveling field is reversed, the motor becomes a generator and provides additional power off the turbine and adds to the MHD capacity. Braking energy can be realized as the turbine speed is slowed as necessary through the flight regime (i.e. during landing, loiter, etc.) by fuel burn adjustment and can be re-used and fed back into the electrical turbine network.

Operation of the AHMJET System

The following stage of operation description defines the AHMJET technology from an engine systems perspective covering compression, ignition, combustion, flame management, MHD electric generation, power architecture, magnetic levitation and subsonic, supersonic and hypersonic transition. In essence, the staged operation running of AHMJET is a seamless technology approach toward the creation of a hybrid propulsion system that covers all propulsion needs across all flight regimes.

Initiation of Combustion: Entropy and Enthalpy

The gas turbine engine combustor 109 increases the enthalpy of the working fluid by oxidization of fuel and the subsequent dilution of the resulting products with additional air until temperatures acceptable to the turbine are achieved. From an operability viewpoint, the combustor 109 must provide a flow environment that is conducive to both ignition and the stability of the flame over a wide variety of engine operating conditions. Steady performance requirements are more easily met with AHMJET because each compressor stage performs individually to a specific thermal profile and compression ratio target as they are all segmented electronically in the shaftless drive exoskeleton and are not connected to one another. Additionally the electric compression portion of the AHMJET more readily is controlled and meets the steady performance requirements for combustion, acceptable exit temperature profiles, low-pressure losses and minimal pollutant emissions are necessary.

CFD gas turbine combustor modeling has generally been limited to isolated parts of the combustion system. Reacting flows inside the combustor liner are more easily controlled with the assumed profiles and flow spits at the various liner inlets in the AHMJET annular combustor 109, and exoskeleton cooling from the by-pass air. Pattern factors, emissions and combustion efficiencies are more easily controlled and managed in conjunction with the electric power architecture which sets the combustion cycle mass air flow into the combustor 109, flame front progression and thermal cooling of the combustor liner.

Stage 1—Initiate Combustion—Start

Figure 5:
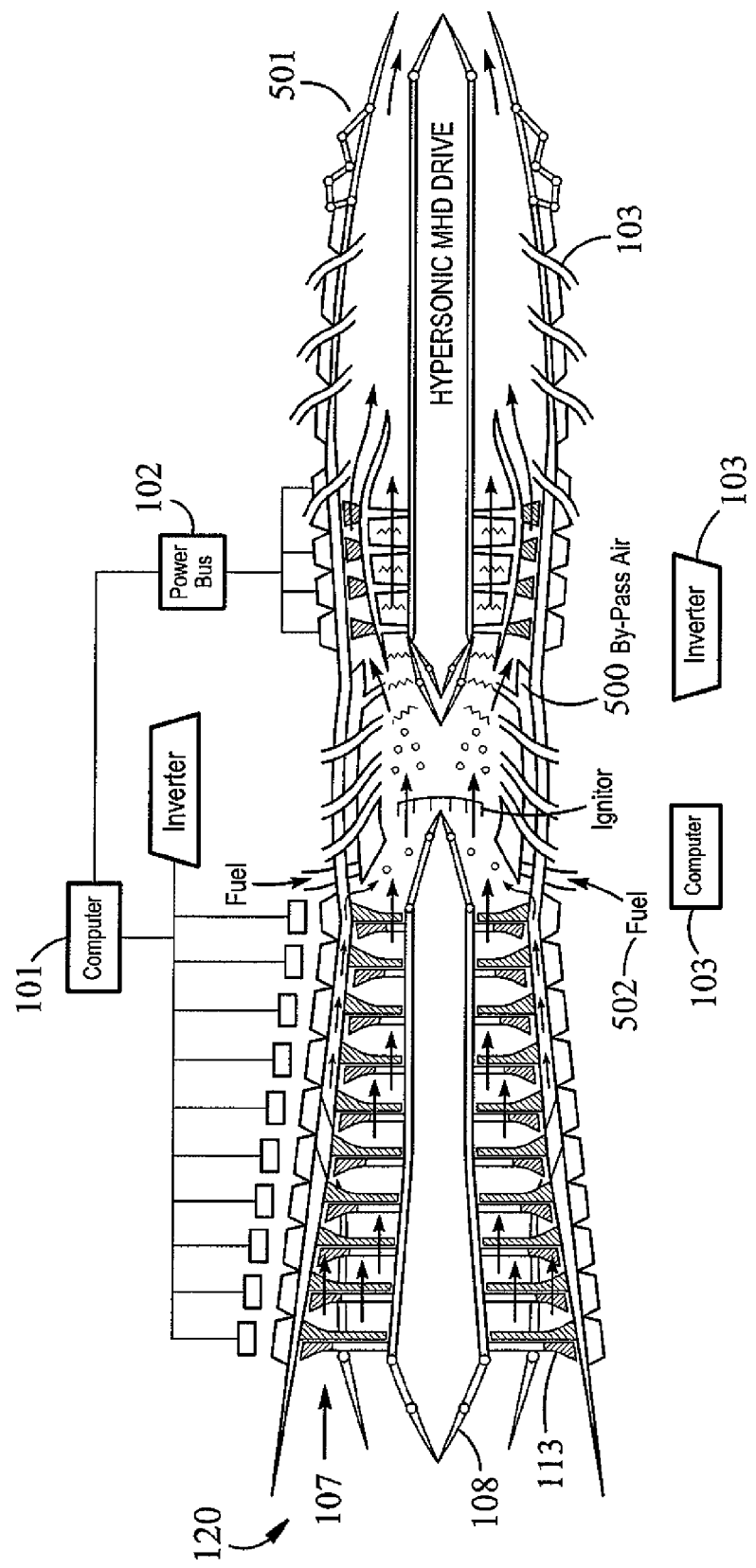
FIG. 5—Depiction of the starting stage of the combustion phase of the jet-electric turbine FIG. 6A—Depiction of the idle-up stage of the hypersonic MHD drive FIG. 6B—Depiction of the by-pass air gate during the idle-up stage FIG. 7A—Depiction of the subsonic stage of the hypersonic MHD drive FIG. 7B—Depiction of the proximal end of the hypersonic MHD drive during the subsonic stage FIG. 8A—Depiction of the transonic stage of the hypersonic MHD drive FIG. 8A-1—Depiction of the distal end of the hypersonic MHD drive during the transonic stage FIG. 8B—Depiction of the combustor turbine gate of the transonic stage FIG. 9A—Illustration of the supersonic stage of the hypersonic MHD drive FIG. 9B—Depiction of the proximal end of the hypersonic MHD drive during the supersonic stage FIG. 10A—Illustration of the transhypersonic stage of the hypersonic MHD drive FIG. 10B—Depiction of the distal end of the hypersonic MHD drive during the transhypersonic stage FIG. 11—Illustration of the hypersonic stage of the hypersonic MHD drive FIG. 12—Detailed illustration of the hypersonic stage of the hypersonic MHD drive with enlargements of the rotor and ring motor armature

This stages is illustrated in FIG. 5A wherein the gas turbine engine combustor 109 increases the enthalpy of the working fluid by oxidization of fuel 502 and the subsequent dilution of the resulting products with additional air until temperatures acceptable to the turbine are achieved. From an operability viewpoint, the combustor 109 must provide a flow environment that is conducive to both ignition and the stability of the flame over a wide variety of engine operating conditions. To meet steady performance requirements, acceptable exit temperature profiles, low-pressure losses and minimal pollutant emissions are necessary. By-pass air dump regions 500 are located on opposite sides of the turbine.

The start of AHMJET requires a ground based power supply to electrify the electric ring motor compressor at the forward part of the engine. The compressor, once running, compresses air for combustion. In concept, air raised to 20 atmospheres will combust in a highly atomized fuel mixture with the insurgence of igniters, causing ignition at the flame holder in the annular combustor 109. Numerically this is an air pressure of 292.4 PSI for initial combustion, and 1000 degrees Fahrenheit. Temperature rise in the combustor 109 with the spread of the flame front down the length of the combustor 109 impinges the turbine blisk, rotating it, and this starts generating electric power at the back end of the AHMJET from the turbine ring motor generators. The combustion flame front 501 is viewable in the combustor region 109. Electric power from the turbine ring motor generators (which is ahead of the MHD generator) ramp up in power to sustain the electric compressor at the front end of the engine and the power required to run the magnetic air bearing of the electric compressor and the turbine generator. From a stationary position through the start sequence, and until enough power is generated by combustion to support the magnetic levitation exoskeleton of the shaftless turbomachinary design, the mechanical roller bearings embedded in the trunions of the compressor, and turbine blisks allow the AHMJET to spin freely and come up to speed whereby the exoskeleton is levitated by the magnetic bearings made up of permanent magnets in the trunions and the induction coils in the exoskeleton outer casing.

Stage 2—Idle Up

Idle up, as depicted in FIG. 6A, is the engine run sequence where the AHMJET runs to high idle (estimated set point is 18,000 RPM) to operational temperatures and stabilized combustion and energy generation conditions through the turbine magnetic generator, and this power feeding electricity and sustaining compressor operation for combustion without the ground power supply for start-up. In idle up the MHD is non operational. Compression ratios run a little higher as RPM is higher and at a higher percentage of throttle setting. At start a 10:1 compression ratio is typical, at idle up compression ratio runs to 12:1 with operating temperatures between 1050 and 1200 degrees Fahrenheit (estimated operating temperatures are 1600 degrees Fahrenheit). Bypass air and compressor air are not at equal percentages, as more compressed air is required for combustion and electric generation while the system warms up and equilibrium is established between compression and combustion, percentage ratios are 70% compression air and 30% bypass air. Max thrust, dry/wet will vary with compressor inlet temperature and pressure. Ionization ring 601 is present in the combustor region. Feature 601 shows the by-pass air inlet portion of the turbine, which is enlarged in detail in FIG. 6B.

FIG. 6B shows a bypass air gate 602 through which air flows below a series of rotor 113 and stator 115 duets. Adjacent to the air gate 107 are ring motor coils 603. Inverter 103 is depicted herein to show the configuration of the bypass air gate 602 relative to the turbine.

Stage 3—Subsonic Combustion

Figure 7A:
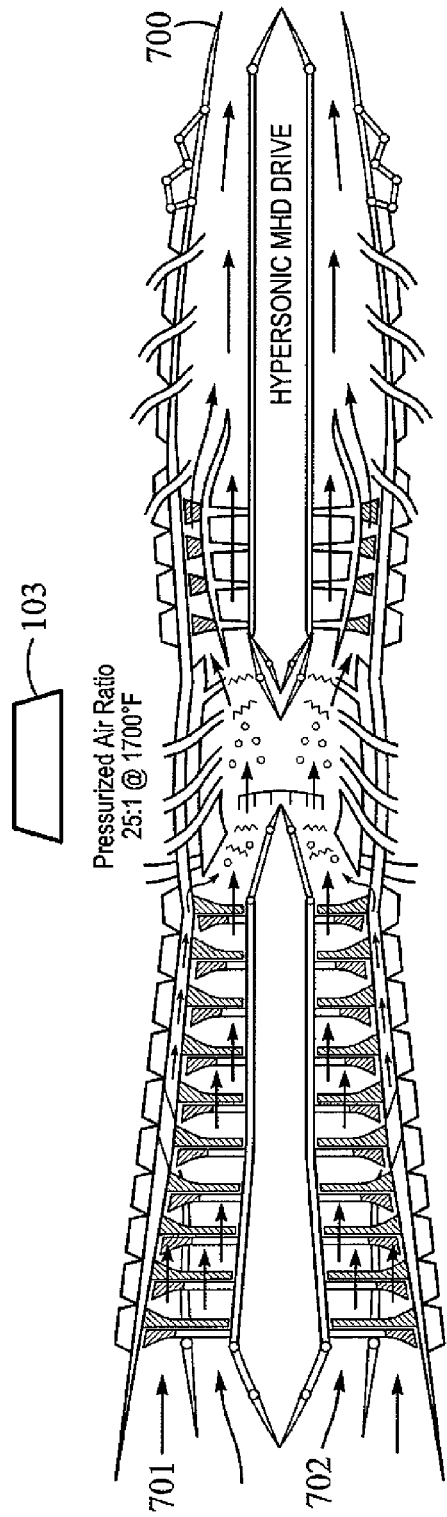

In subsonic combustion and operation AHMJET acts as an efficient low by-pass turbofan. This is depicted in FIG. 7A.

Both core compressor air and by-pass air contribute to combustion processes. Flight regime is between 0.10 mach and 0.94 Mach with by-pass air being routed through the by-pass gates which are open between the compressor and diffuser stages, routing the air through the exoskeleton wall in the exoskeleton casing channels, towards the back of the engine, cooling the combustor 109 as it passes, adding to the exhaust thrust and gas temperature, cooling as it mixes with the hot turbine exhaust gases upon exit. Observation at 80% power, whereby exhaust nozzle 700 is open 80 percent, and a subsequent 180 Lbs/Sec mass airflow 702 and above, and 1700 Degrees F. exhaust gas temperature, and 20,800 gas horsepower, pushing through an approximate 400 Sq/In conical nozzle. At ISO conditions of 1000' altitude, 59 Degrees F. 37,000 to 38,000 Lbs thrust are possible in subsonic cruise configuration.

Figure 7B:
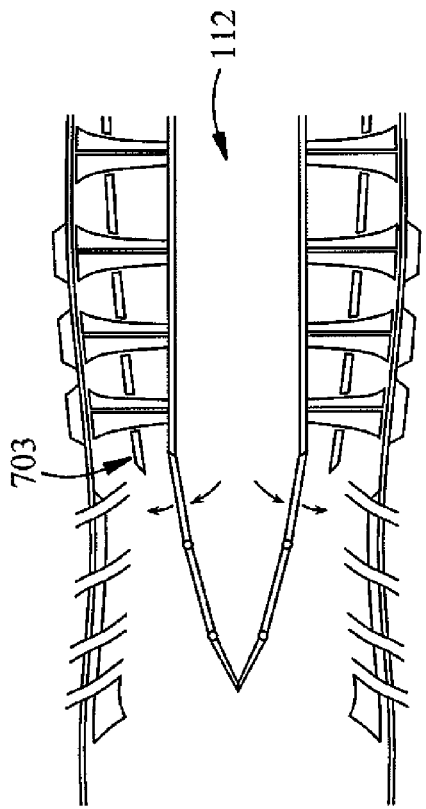

The AHMJET engine in dual cycle (with downstream power turbine running) is estimated at about 35% efficiency at subsonic rated power. Therefore at 80% power 16,000 SHP (eight compressor stage ring motors rated at 2500 SHP each is 20,000 SHP at 100% power) is used to spin the rotor(s) 113 of the compressor 701 consuming 11.93 MW. The magnetic generation turbine aft of the combustor 109, made up of four turbine blisks and magnetic trunions, supplies 14.92 megawatts of power through the power architecture of inverters 103 and buses 102. An additional load of 2980 SHP can be accommodated by altering the turbine nozzle throat areas. Transonic operation includes turbine thrust air and by-pass air for thrust with a front fan face mass air flow 702 above 180 lbs/Sec. By pass air ducts are open to feed bypass air past the combustor 109 for cooling and to increase exhaust gas mixing and thrust efficiency at exhaust exit 112. FIG. 7B depicts the proximal portion of the hypersonic combustion ram 112 as the combustion gate 703 begins to move back.

Stage 4—Transonic Combustion

Figure 8A:
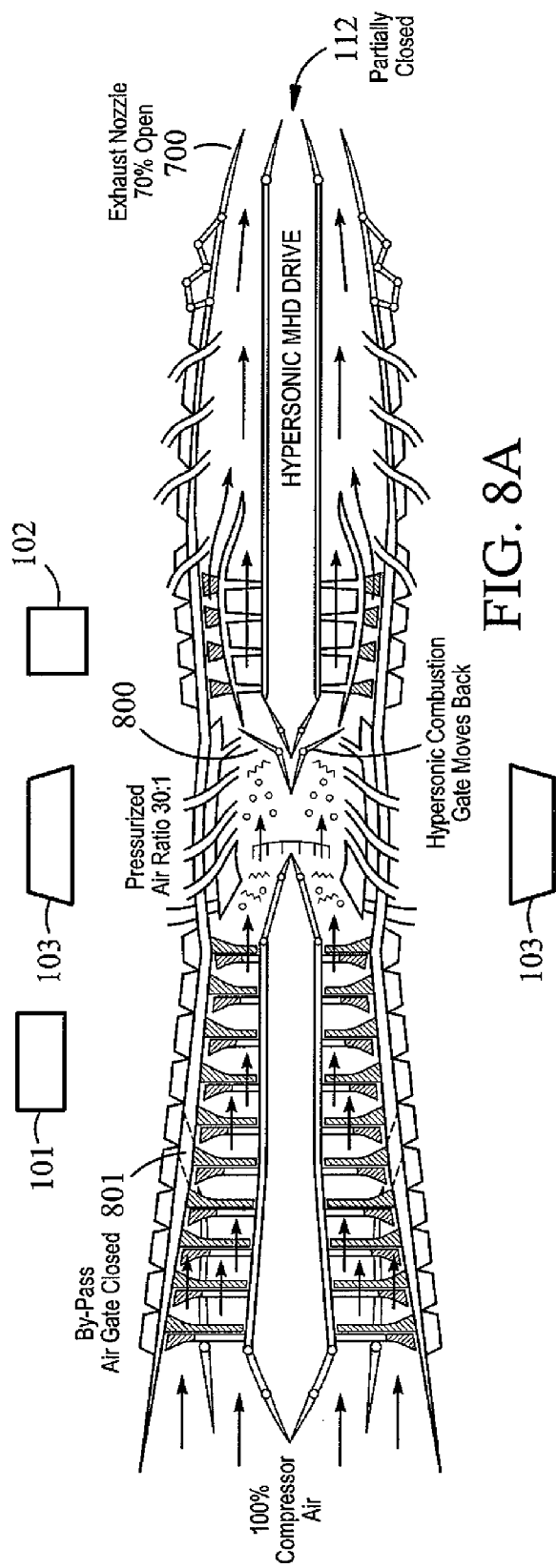

Transonic combustion is depicted in FIG. 8A and covers the operation and flight regime typically between Mach 0.95 and Mach 1.2. It is the transition point for turbomachinary mechanics whereby the engine cycle is demanded to change due to the change in air velocity, subsequent mass air flow, temperature rise to higher entropy state of supersonic combustion and increased air drag of air through the combustor 109 due to eddy current destabilization and subsequent parasitic drag. Transonic Combustion denotes the largest change in heat transfer and the greatest change in "delta" of entropy of the gas (both in heat dynamics and pressure) with the AHMJET functioning as a pure turbine in this regime and transitions electrically and magnetically from subsonic regime to supersonic regimes. Initial combustion which preempts the start of the AHMJET can be expressed mathematically and provides the basis and uniqueness of the AHMJET combustion system and transition stages as the amount of power form the system at this stage of combustion:

$$P = au2B2/1 + B2 \times K(1-K)$$

Whereby combustion velocity is below 1000/meters per second and combustion temperatures are below 1500 degrees Fahrenheit.

Individual steady flow performance models are typically developed for each component in an engine design with results of the performance of the combustor 109 and the turbomachinery are predicted independently. The aerodynamic performance and durability of the fan, compressor and turbine blading are predicted independently of both one another and also independently of the combustor 109, with the combustor performance predicted independently of the upstream compressor. The surge and choke lines bound the operating range of a gas turbine engine on a compressor aerodynamic performance map. To assure compressor stability during engine operation, an engine is designed with a surge margin. This entails assuring that the operating point remains a specified distance from the surge line on the performance map. Large surge margins are employed due to transient conditions that move the compressor operating point closer to the surge line.

However, a large surge margin that places the compressor operating line far from the surge line can preclude operation at the peak pressure rise or maximum efficiency region. Also, the increase in operational range results in additional flexibility for matching the compressor with the other gas turbine engine components. The term surge line is actually a misnomer as two types of instability can develop: surge or rotating stall. Surge is a global axisymmetric oscillation of the flow through the compressor, and can also include reverse flow during a portion of the surge cycle.

These oscillations can result in severe damage to the mechanical components of the engine from the unsteady thrust load or the ingestion of combustion gases into the compressor and engine inlet. In a severe surge cycle, the reversed flow through the compressor can extinguish combustion, resulting in a "flame out" or total loss of engine power. Rotating stall is a local flow deficit that rotates around the compressor annulus. This flow deficit, or cell, is a region in which the local mass flow is near zero.

The AHMJET technology is unique and novel in that each compressor stage is operated separately as a thermodynamic and compression device due to the shaftless exoskeleton design and no drive shaft. Each independent compressor stage (a rotor 113 and a stator) offers pressure differentials, as a Delta D, preventing surge, particularly in front of the annulus of the combustor 109 in the last compressor stage, as depicted in FIG. 7A. Separate compressor stages offer separate RPM adjustments to surge pressures when a pre-ignition or surge combustion occurs in the combustion process when fuel atomization is in transition, particularly during transonic conditions, again where enthalpy and entropy conditions are not steady state. The central digital control computing system of AHMJET can reduce or increase surge conditions to nullify or reduce pressure differentials, even at high atmospheric conditions, typically above 25:1 but below 30:1. This provides safety margin of operation, reduction of flame out events and conservation of energy and reduction of risk to implosion dynamics of rotating compressor components and destruction of the combustor liners.

Figure 8B:
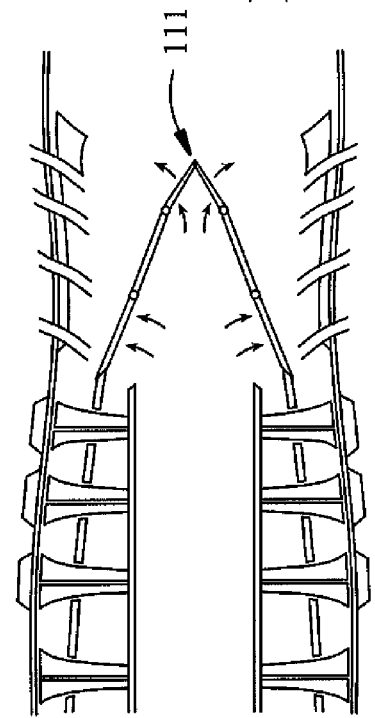
Figures 1, 8A:
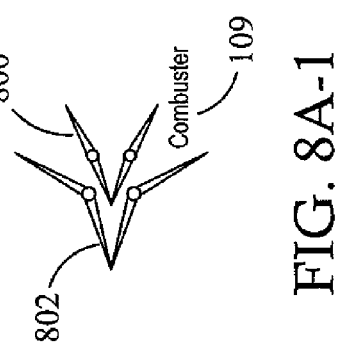

As illustrated in FIG. 8A, the exhaust nozzle 700 is 70 percent open. The gate of the magneto hyperdynamic drive 112 is partially closed and the hypersonic combustion gate 802 moves back, as depicted in 800. An enlargement of 800 is provided in FIG. 8A-1. The exoskeleton bypass air gate is closed, as seen in highlighted feature 801. FIG. 8B shows the distal end of the hydrodynamic compression ram 111 as it begins to open.

Stage 5—Supersonic Combustion

Supersonic combustion occurs with both the electric compressor and turbine generator in operation at compressor ratios higher than 30:1, temperatures above 2500 degrees Fahrenheit, and rotating speeds above 25,000 RPM. At this stage of operation there is a surplus of electric power beyond what is required to run the magnetically levitated electric compressor, drive the magnetically driven compressor, from the gas turbine generator (four turbine blisks generate power from the exoskeleton ring motor generators and the embedded permanent magnets in the blisk trunions) and sustain the magnetically levitated turbine rotor blisks with power. This stage is illustrated in FIGS. 9A and 9B.

To attenuate the usage of propulsion in climb out and attain efficient super cruise once at altitude of AHMJET in manned and unmanned air vehicle applications, the turbine nozzle throat changes geometry, hence exhaust velocity and pressure can be modulated, so not only offering flight speed governance but also offering an additional load of 4500 SHP available (3.35 MW) for airframe electrical power (laser weapons and sensors) but additional power to transition the AHMJET into transhypersonic operation. Atmospheric pressure of the hot gas exhaust stream has direct impact on the power density of the MHD drive generation system. As the velocity of the hot exhaust gas increases due to requirements of flight envelope to accomplish missions, power density, or the amount of load that can be carried by the field of magnetic induction from the hot jet exhaust gas stream of the AHMJET.

Supersonic combustion in AHMJET covers the flight operational envelope of the engine from Mach 1.2 to Mach 3.2. Above Mach 3.2 the engine is considered to be in transhypersonic stage. The operational limit of AHMJET in the supersonic regime is constrained by material temperature limits of the combustor liner, stationary and rotating turbine components. However, since AHMJET is an exoskeleton inside-out design, these turbomachinary components are loaded in compression and they can be manufactured out of high temperature, fiber reinforced, hot isostatically pressed (sintered) ceramic matrix composites. These sintered materials exhibit significant higher temperature capabilities than highly alloyed metals for these types of turbomachinary components so that combustion processes in the supersonic regime where entropy is the highest, they may withstand higher combustion temperatures, thus higher operating temperatures and more complete combustion of fossil fuels (Jet-A, Hydrogen, etc.). Mach 2.8 is near the limit of combustion temperature, Mach number, exhaust velocity.

From seeding ports 104, there is selenium positive ion seed flow 900 and negatively charged ions 901. The exhaust nozzle 700 is 50 percent open. The hypersonic magneto hydrodynamic drive cone 902 provides complete obstruction but is opened to the combustor 109. FIG. 9B shows an enlargement of the opening of the cone in the combustor region Stage 6—Transhypersonic Combustion Transhypersonic operation occurs above the 100% throttle mark setting of AHMJET driven up by the transitioning of the MHD drive coming on line in the engine and generating electric power. Estimates are at 105% with therefore 21,000 SHP (eight compressor stage ring motors 106 rated at 2500 SHP, producing 20,000 SHP at 100%) being required to spin the compressor rotor(s) 113. This consumes 15.66 MW. Another element novel and unique about the AHMJET technology is that in this combustion phase the magnetic generation turbine aft of the combustor 109, made up of four turbine blisks and magnetic trunions, plus the exoskeleton magnetic plates 117 acting as anode and cathode supplies 14.92 megawatts (MW) of power through the power architecture of inverters 103 and power buses 102, with the difference of power requirements coming from an additional load of 6600 SHP available (4.92 MW) accommodated by alternating the turbine nozzle throat area. This is in single cycle magnetic jet-electric generation just prior to the MHD drive coming on line. The transhypersonic phase establishes simultaneous combustion and generation cycles which are unique to AHMJET, that allow the engine to transition from an air breathing turbine cycle engine, to a pure air breathing scramjet combustion hybrid.

Transhypersonic defines AHMJET as a propulsion machine as a true hybrid in this stage as the majority of the combustion/propulsion comes from the turbine generator and the MHD drive has begun to come on line. Full operation of scramjet propulsion occurs not until the exhaust magnetic flux passing perpendicular to the MHD magnetic flux between the magnetic conductive plates reach 5000 degrees Fahrenheit at which point the energy density, or magnetic density is high enough to sustain the continued magnetic levitation of the electric compressor and the turbine generation, beyond which, in the final hypersonic stage, the compressor and combustor 109 are shut down by the central AHMJET computer 101 and the electric power architecture, and combustion as a scramjet propulsor sustains flight speeds above Mach 5.8 and generation capabilities above 15.75 MW, the minimum amount of power required by the electric compressor to run and make the transition from transhypersonic to hypersonic operation.

Figure 10A:
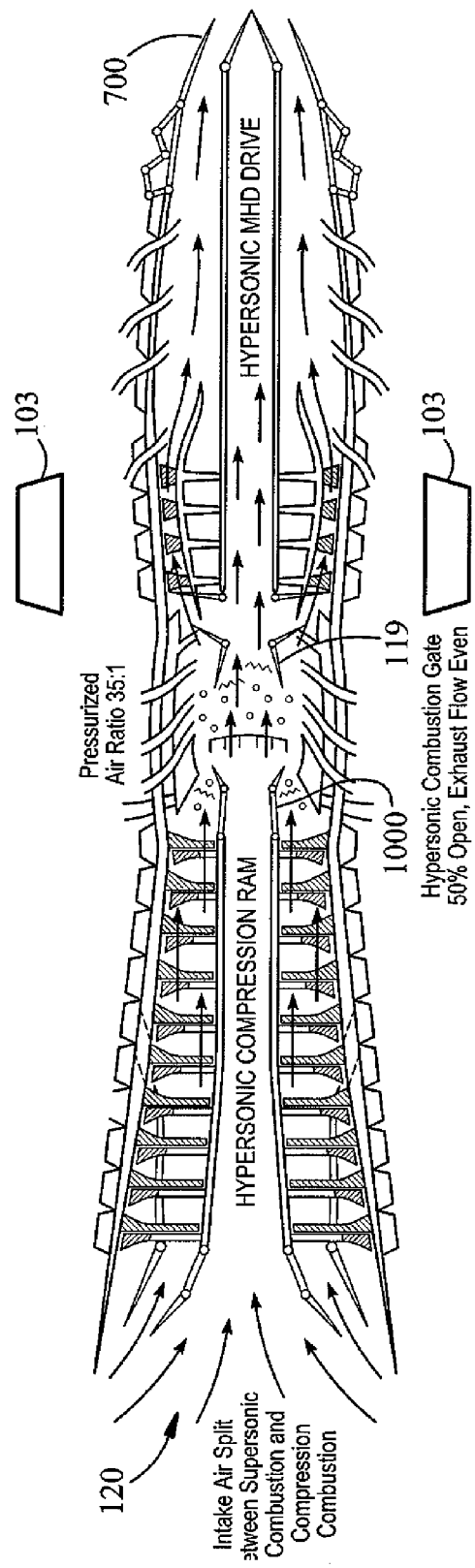
Figure 10B:
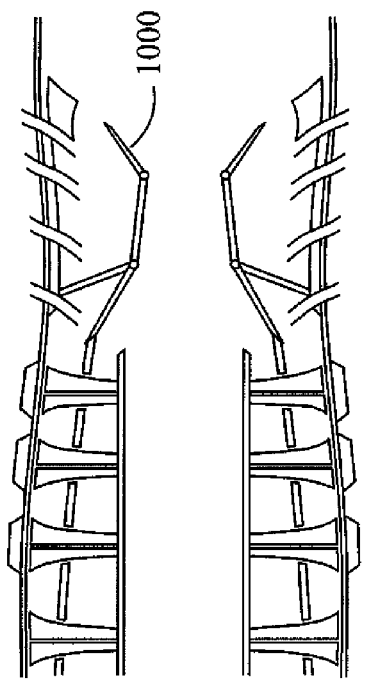

Transhypersonic combustion is depicted in FIG. 10A and 10B, wherein FIG. 10A depicts the air split 120 and opening of the hypersonic combustion gate and pressure ratio. The intake air is split between hypersonic combustion and compression combustion. Petal cone 119 moves outward to direct air into the hypersonic compression ram 111, which as previously described, is 100 percent open. The compressor is partially closed. FIG. 10B illustrates the distal portion of the hypersonic compression ram 111 in this stage.

Stage 7—Hypersonic Combustion

While a ramjet is well suited for the cruise portion of the flight, a ramjet can not generate static thrust. Another propulsion system is needed to accelerate the aircraft until the ramjet can generate sufficient thrust. This is the basis of the AHMJET of the present invention in that it addresses the creation of combustion and turbine technology for propulsion in the low speed ramjet environment. Turbine Based Combined Cycle (TBCC) engines are and approach, and AHMJET provides a solution to the low speed combustion problem with transitioning turbine cycle technology, MHD electric power generation and magnetic propulsion.

Because of the pressure losses associated with the terminal shock of the inlet, a ramjet has very limited performance beyond Mach 5. For aircraft speeds which are much greater than the speed of sound, the aircraft is said to be hypersonic Typical speeds for hypersonic aircraft are greater than 3000 mph and Mach number is greater than five, (M>5.0 The chief characteristic of hypersonic aerodynamics is that the temperature of the flow is so great that the chemistry of the diatomic molecules of the air must be considered. At low hypersonic speeds, the molecular bonds vibrate, which changes the magnitude of the forces generated by the air on the engine inlet and diffuser. At high hypersonic speeds, the molecules break apart producing electrically charged plasma around the diffuser, engine inlet, and at the annulus to the combustor. Large variations in air density and pressure occur because of shock wave, and expansions of shockwaves around the aircraft.

The propulsion equation for hypersonic establishes equilibrium challenges thermodynamically and chemically as current technology has established no solution to true Turbine Based Combined Cycles. It is the transition from turbine based, air breathing aerodynamics, to non-turbine based combustion cycles, where hypersonic combustion dynamics due to extreme air compression in the diffuser causes dramatic atmospheric rises to the point of combustion with atomized fuel pressure and an equilibrium must be reached in the transition. Scramjet based combustion cycles are critical as combustion is dependent purely on the extreme pressurization of incoming hypersonic air, and past engine designs have not been able to address this issue.

Figure 11A:
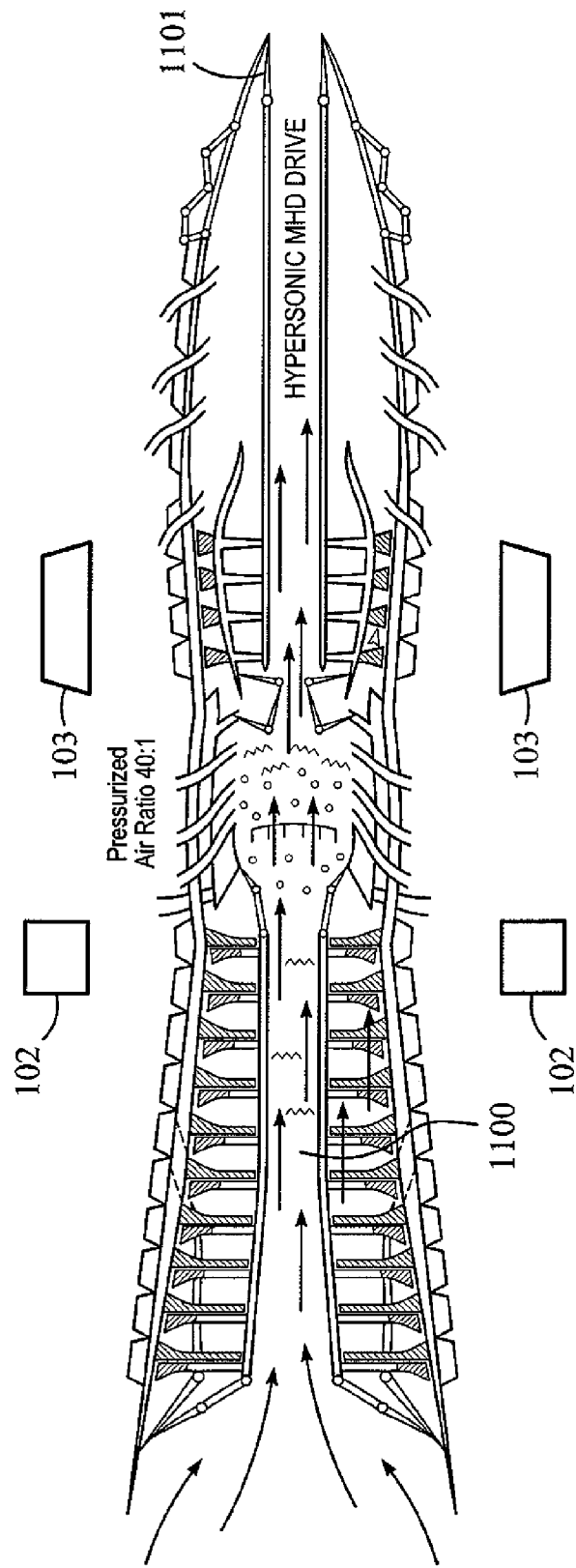

The AHMJET technology breaks away from past approaches in turbine engine thermodynamics in that it provides dual combustion chambers and exhaust chambers parallel to one another (this is unique and novel), that not only where both turbine based combustion and hypersonic propulsion thermodynamics can occur, but the engine configuration and hypersonic combustion ramps/petal gates 108 and 119 can close off the deleterious effects of aerodynamics drag of rotating turbine components once hypersonic scramjet combustion begins to occur, and the combustion process and MHD electric generation can happen concurrently. This is depicted in FIG. 11A. The velocity and shock wave front cause combustion in the hypersonic compression ram without compressor stages.

Figure 11B:
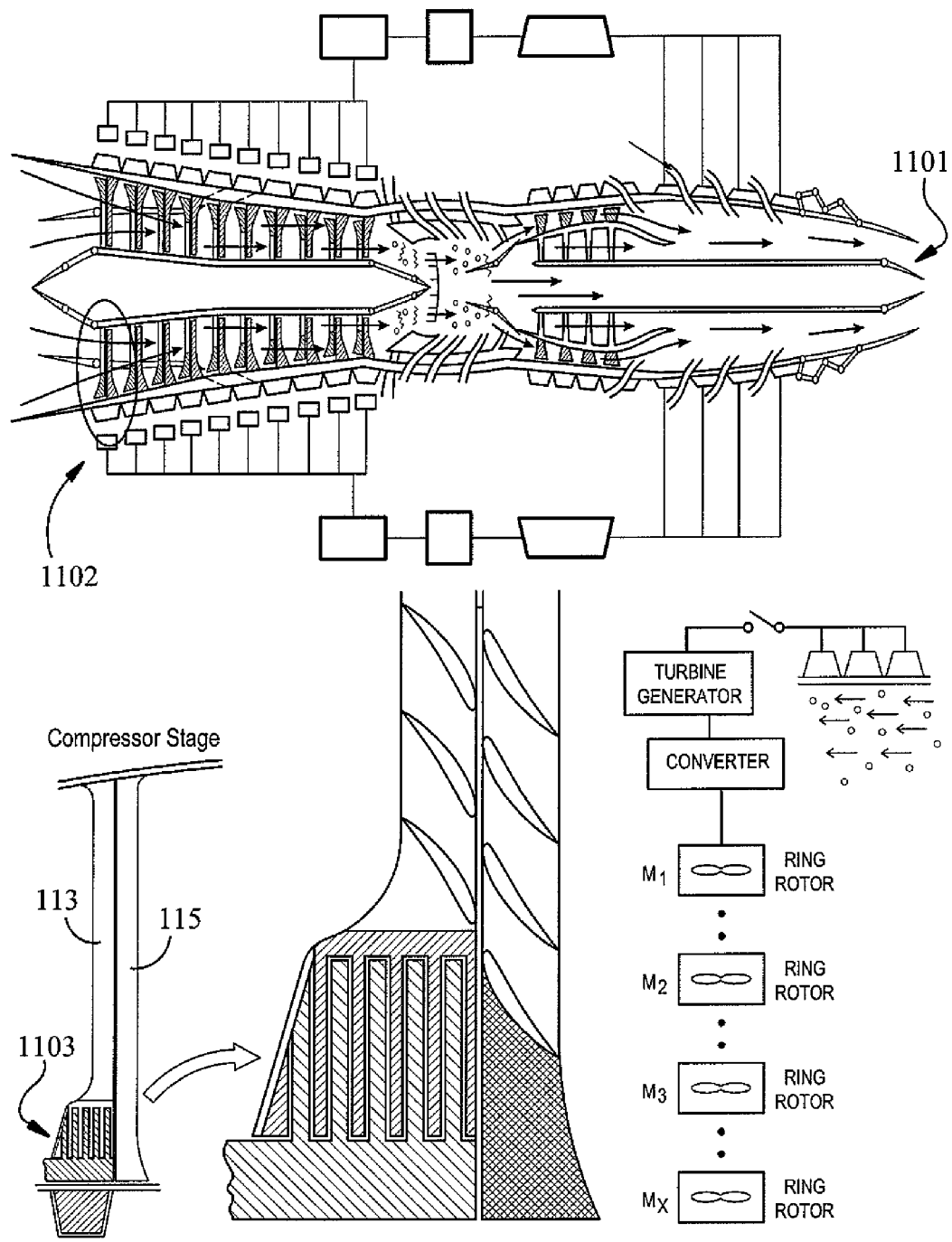

The dual hypersonic MHD drive chamber and the parallel turbine generator/MHD drive generator allow for the finite transition between the upper limits of supersonic operation (Mach 2.8) and the lower limits of hypersonic scramjet combustion (Mach 3.3). FIG. 11B illustrates the hypersonic phase depicted in FIG. 11B with enlargements of regions 1101 and 1102. Region 1101 contains the bypass air inlet gate, similar to that illustrated in FIG. 6B. Herein, region 1101 shows a further enlargement of the compressor stage of the rotor 113 and stator 115.

Figure 12:
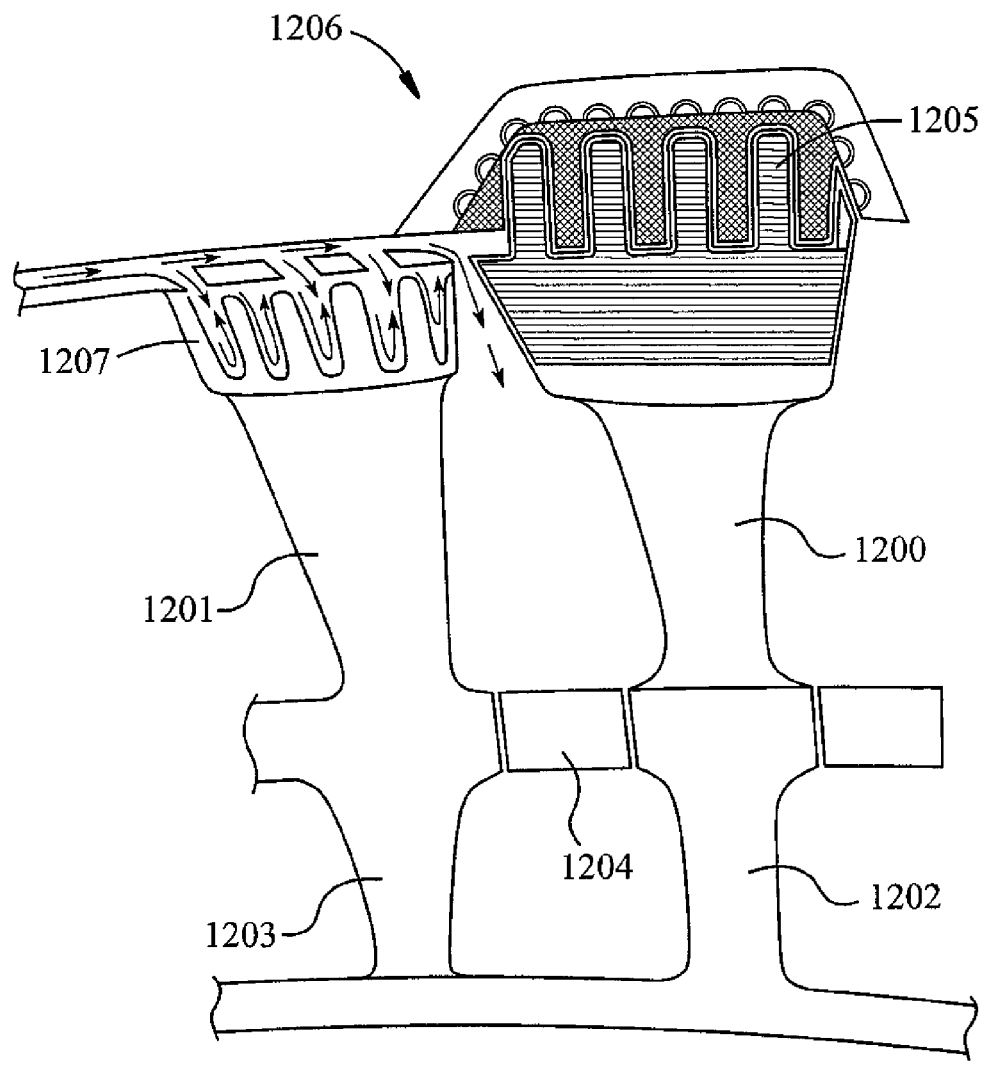

FIG. 12 presents and inverted depiction of the rotor 113 and stator 115 in the compression phase. It shows the single stage of the turbine rotor ring motor generator 1206. In the outer rotor trunion 1205, a permanent magnet is embedded therein. Trunion cooling channels 1207 are depicted for by-pass air in stator 115. Stator 115 has a high speed section 1201 and low speed section 103. The rotor 113 has a corresponding high speed section 1200 and a low speed section 1202. Intermediate fixed inner casing structure 1204 is set between the rotor 113 and stator 115.

The AHMJET has a significant quantity of ceramic matrix composites in it, roughly 40% by weight. The rotors 113 and stators 115 of the vanes are to be made from high temperature, hafnium carbide fiber-reinforced, ceramic matrix composites. Hafnium carbide is typically utilized in its discontinuous fiber reinforcement form, although it is available in continuous fiber threaded forms. All these fibers are very small in diameter, with twist (turns per inch).

Turbomachinery components in dynamic rotating environments in engines must be manufactured and reinforced with continuous reinforced fiber, as in the ceramic high temperature fiber, hafnium carbide. Currently technology, followed by turbomachinery manufacturers who use CMCs in static (not moving) components uses short (or chopped) ceramic reinforcement fiber.

To meet dynamic loads of rotating turbine components, plus hollow construction for cooling, fibers must be continuous, and to follow configurations of vanes, stators and compressor buckets, acute angles are prevalent.

A new method must be devised to use continuous fiber performs (near net shape composite reinforcements of which are bonded in composite tooling with the ceramic matrix, usually high temperature silica). One aspect of the present invention involves a method for manufacture of its vanes, stators, compressor buckets and turbine blisks with continuous fiber.

The method approaches untwisting the hafnium carbide fiber, and in some cases the silicone carbide reinforcement fiber so that there is no twist, prior to weaving the fiber into a net shape perform. The untwisting reduces or removes the shear load on the fiber from the twist and makes it less brittle. For 90 degree corners and more acute angles the fiber may be broken once, untwisted and jigged to the correct angle, then the single yarns of the fiber interwoven with the perform in the tool, rewoven to a continuous net shape fiber as part of the preform. This is a tedious job, but it has been found to be the only way to provide continuity of maintaining a continuous load path for the fiber reinforced ceramic. This sounds so very simple someone must have thought about it. Well, turbine engine manufacturers are focused on metal components because they are only using these in turbines with driveshafts and everything is loaded in extension, so they cannot use ceramic composite rotating (rotors 113, vanes, blisks) components. Put everything in compression like in the AHMJET design, as an inside-out, shaftless turbomachinary design, and ceramics can be used.

Tooling for these ceramic components are typically highly alloyed aluminum tools. Stitching the perform after untwisting the fiber is completed first, then the perform of the vane or stator is laid into the tool with previously coated mold release in it, the tool is closes and the silica carbide matrix (glue) is injected in the ports of the tool.

Ceramic fiber reinforced composites need to be cured under pressure and temperature, usually to 7-8 atmospheres and a minimum of 1200 degrees Fahrenheit, from 48 to 72 hours. This would be the typical approach for compressor and turbine components such as vanes, stators 115, buckets and rotors 113.

Turbine blisks are large, dynamic, highly detailed aerodynamic components. They are a fully integrated turbine wheel with the turbine airfoils integrated as part of the turbine wheel. The manufacture of the hollow-core, air cooled turbine rotor airfoils is set forth as follows. Turbine rotor airfoils are generally air cooled, and thus manufactured as hollow parts. These are the components that are directly behind the exhaust combustor stators 115 aft of the combustor 109 where the exhaust gases are of the highest temperature, and the velocity is the highest of the gas. Thus operating temperatures are the highest and airfoils are exposed to the greatest loads and temperatures. They subsequently must be cooled. In all known advanced jet engine designs these components are cooled by compressor air coming off the compressor during operation of the engine.

To provide more efficient cooling for these dynamic components, a manufacturing method using these components and exposing them to more dynamic active cooling is disclosed herein. Operating temperatures of these components behind the combustor 109 typically exceed 3500 degrees Fahrenheit. To prevent melting they are typically exposed to cooling air from the compressor which flows through channels in the vane or stator 115.

The AHMJET of the present invention is designed to operate at above 5000 degrees Fahrenheit in hypersonic combustion regimes. The stators 115, vanes, rotors 113 and blisks to be manufactured may use nano-carbon tubules for reinforcement strength and for cooling during the transhypersonic regime where the components are exposed to these very high temperatures. It is known in the art to use carbon nano-tube technology has been around for some period of time and in the manufacture of turbine stators and rotors 113 where the temperatures are the highest in the AHMJET, these hollow structures are aligned radially in the component. The AHMJET turbine ring motor generators are superconducting and cooled with liquid helium and/or nitrogen.

This nitrogen pool is used in the jet electric turbine of the present invention to cool the stator and rotor components in the turbine rotor ring motor generator, passing the liquid nitrogen through the nano-tubules embedded in the ceramic turbine components. Manufacture of these components requires consolidation of the ceramic structure under pressure and temperature, while avoiding collapse of the nano-tubules. The nano-tubule structures are pressurized to 5.0 atmospheres, post lay in the tool, and after a vacuum assist of the infusion of the silicone carbide matrix.

It will therefore be appreciated by those skilled in the art that the jet-electric turbine of the present invention and the associated method of manufacture represents a substantial improvement over the prior art.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A system for operating a jet turbine engine, said system comprising:
    a compressor for receiving an intake airflow to the jet engine;
    a hypersonic compression ram radially inward of the compressor for receiving another portion of the intake airflow;
    a combustion chamber fluid communication with the compressor and the hypersonic compression ram;
    a turbine having a plurality of turbine components, wherein a plurality of coils are disposed about a perimeter of said turbine for generating electricity to supply to the jet engine; and
    an electric controller for controlling said turbine.

2. The system of claim 1, wherein at least one of said plurality of turbine components comprises a ceramic matrix.

3. The system of claim 2, wherein at least one of said plurality of turbine components comprises a hafnium carbide fiber reinforced ceramic matrix.

4. The system of claim 2, wherein said plurality of turbine components comprise any of stators, turbine blades, diffuser stators, shroud segments, and turbine discs.

5. The system of claim 1, wherein at least one of said plurality of turbine components comprises continuous ceramic reinforcement fiber.

6. The system of claim 4, wherein said plurality of turbine components comprise compressor vanes.

7. The system of claim 4, wherein said plurality of turbine components comprise diffuser stators.

8. The system of claim 4, wherein said plurality of turbine components comprise turbine blades.

9. The system of claim 4, wherein said plurality of turbine components comprise a ceramic matrix.

10. The system of claim 9, wherein said plurality of turbine components comprise a hafnium carbide fiber reinforced ceramic matrix.

11. The system of claim 9, wherein said plurality of turbine components comprise continuous ceramic reinforcement fiber.

12. A system for operating a jet turbine engine, said system comprising:
    a shaftless turbine having an outer casing and a selectively accessible hollow interior portion radially inward of the shaftless turbine and configured to allow combustion flow to bypass the shaftless turbine;
    an electric controller for controlling said shaftless turbine;
    a main compressor;
    a diffuser;
    a plurality of turbine components, and
    wherein said compressor, said diffuser and said plurality of turbine components operate in dynamic compression within the outer casing of the shaftless turbine.

13. A system for operating a jet turbine engine, said system comprising:
    a shaftless turbine having an outer casing;
    a hypersonic exhaust duct radially inward of the shaftless turbine and configured to selectively allow combustion flow to bypass the shaftless turbine;
    an electric controller for controlling said shaftless turbine;
    a compressor;
    a diffuser;
    a combustor;
    a turbine generator; and wherein the electric controller operably controls rotational characteristics of the compressor independent of rotational characteristics of one of the diffuser and the turbine generator.

14. The system of claim 13, wherein the electric controller operably controls the rotational characteristics of the diffuser independent of the rotational characteristics of the turbine generator.

15. The system of claim 13, wherein the compressor comprises a plurality of compressor stages and wherein the electric controller operably controls rotational characteristics of a first compressor stage independent of rotational characteristics of a second compressor stage.

16. The system of claim 15, wherein the first compressor stage and the second compressor stage are adjacent within the compressor.

17. The system of claim 13, wherein the compressor comprises a plurality of compressor stages, each stage comprising a rotor assembly and a stator assembly.

18. The system of claim 17, wherein the electric controller operably controls rotational characteristics of the rotor assembly of a compressor stage independent of rotational characteristics of the stator assembly of the same compressor stage.

19. A method of operating a turbine engine comprising:
    (A) providing a shaftless engine comprising:
        i) a generally cylindrical frame with interior and exterior surfaces,
        ii) a plurality of shaftless turbine blade assemblies movable relative to the interior surface of the cylindrical frame, and
        iii) a plurality of induction coils disposed about a perimeter of the cylindrical frame;
    (B) creating a combustion event;
    (C) converting kinetic energy from the combustion event into rotational motion of at least one shaftless turbine blade assembly relative to the interior surface of the cylindrical frame by exposing the at least one shaftless turbine blade assembly to the combustion event; and
    (D) converting mechanical energy from the rotational motion of the at least one shaftless turbine blade assembly into electrical energy by inducing an electric current in the induction coils with a magnetic field.

20. The method of claim 19 wherein at least a portion of the blade assembly comprises a magnetic material and wherein (D) comprises:
    (D1) exposing the induction coils to the magnetic fields generated by the shaftless turbine blade assembly.

21. A method of operating a turbine engine comprising:
    (A) providing a shaftless engine comprising:
        i) a generally cylindrical frame with an interior surface,
        ii) a plurality of shaftless turbine blade assemblies movable relative to the interior surface of the cylindrical frame, and iii) a plurality of induction coils disposed about a perimeter of the cylindrical frame;

(B) inducing an electric current in the induction coils to create a magnetic field;

(C) exposing at least one of the shaftless turbine blade assemblies to the magnetic field; and (D) converting electrical energy from the magnetic field incident on the shaftless turbine blade assembly into rotational motion of a compressor blade assembly relative to the interior surface of the cylindrical frame.

22. The method of claim 21 wherein at least a portion of the shaftless turbine blade assembly comprises a magnetic material.

\* \* \* \* \*